US010910892B2

(12) United States Patent
Hirotani et al.

(10) Patent No.: US 10,910,892 B2
(45) Date of Patent: Feb. 2, 2021

(54) ROTARY ELECTRIC MACHINE AND ELECTRIC POWER STEERING APPARATUS

(71) Applicant: Mitsubishi Electric Corporation, Tokyo (JP)

(72) Inventors: Yu Hirotani, Tokyo (JP); Kazumasa Ito, Tokyo (JP); Yuji Takizawa, Tokyo (JP); Satoru Akutsu, Tokyo (JP); Hiroshi Aida, Tokyo (JP); Shusuke Hori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 602 days.

(21) Appl. No.: 15/562,980

(22) PCT Filed: Apr. 22, 2015

(86) PCT No.: PCT/JP2015/062276
§ 371 (c)(1),
(2) Date: Sep. 29, 2017

(87) PCT Pub. No.: WO2016/170624
PCT Pub. Date: Oct. 27, 2016

(65) Prior Publication Data
US 2018/0115202 A1 Apr. 26, 2018

(51) Int. Cl.
H02K 1/16 (2006.01)
H02K 1/14 (2006.01)
H02K 29/03 (2006.01)
H02K 1/27 (2006.01)
H02K 3/32 (2006.01)
(Continued)

(52) U.S. Cl.
CPC ............... H02K 1/16 (2013.01); H02K 1/146 (2013.01); H02K 1/2706 (2013.01); H02K 3/32 (2013.01);
(Continued)

(58) Field of Classification Search
CPC .......... H02K 1/16; H02K 29/03; H02K 1/146; H02K 3/48; H02K 3/32; H02K 1/2706;
(Continued)

(56) References Cited

U.S. PATENT DOCUMENTS

2004/0183393 A1 9/2004 Suzuki et al.
2006/0279160 A1* 12/2006 Yoshinaga ............... H02K 1/16
310/216.011
(Continued)

FOREIGN PATENT DOCUMENTS

JP 43-029856 Y1 12/1968
JP 2-7839 A 1/1990
(Continued)

OTHER PUBLICATIONS

Received STIC search report from EIC 2800 Christian Miner on Nov. 4, 2019. (Year: 2019).*
(Continued)

Primary Examiner — Shawki S Ismail
Assistant Examiner — Htet Z Kyaw
(74) Attorney, Agent, or Firm — Sughrue Mion, PLLC; Richard C. Turner

(57) ABSTRACT

In the rotary electric machine according to the present invention, a plurality of core sheets include linked core sheets that include linking portions that protrude circumferentially from flange portions so as to link together tip portions of adjacent tooth portions, at least one sheet of the linked core sheets is formed such that a tooth tip portion shape is mirror-asymmetrical relative to a tooth central axis that passes through a circumferential center of the tooth portions, and a stator core is configured by laminating the linked core sheets such that circumferential positions of the linking portions are offset.

23 Claims, 20 Drawing Sheets

(51) Int. Cl.
*H02K 3/48* (2006.01)
*H02K 1/18* (2006.01)
*B62D 5/04* (2006.01)

(52) U.S. Cl.
CPC .............. *H02K 3/48* (2013.01); *H02K 29/03* (2013.01); *B62D 5/04* (2013.01); *H02K 1/18* (2013.01); *H02K 1/185* (2013.01); *H02K 1/2746* (2013.01); *H02K 2201/06* (2013.01); *H02K 2213/03* (2013.01)

(58) Field of Classification Search
CPC ............. H02K 2201/06; H02K 1/2746; H02K 2213/03; H02K 1/18; H02K 1/185; B62D 5/04
USPC .......................................................... 310/66
See application file for complete search history.

(56) References Cited

U.S. PATENT DOCUMENTS

| | | | |
|---|---|---|---|
| 2012/0019096 A1* | 1/2012 | Taniguchi | .............. H02K 1/165 310/216.069 |
| 2013/0140930 A1 | 6/2013 | Koka et al. | |
| 2014/0145547 A1 | 5/2014 | Nakano et al. | |

FOREIGN PATENT DOCUMENTS

| | | |
|---|---|---|
| JP | 2003-070189 A | 3/2003 |
| JP | 2004-080944 A | 3/2004 |
| JP | 2004-304997 A | 10/2004 |
| JP | 2005-094901 A | 4/2005 |
| JP | 2016-005301 A | 1/2016 |
| WO | 2011/114574 A1 | 9/2011 |
| WO | 2012/026158 A1 | 3/2012 |
| WO | 2012/043107 A1 | 4/2012 |
| WO | 2013/072531 A1 | 5/2013 |
| WO | 2014/020273 A1 | 2/2014 |
| WO | 2014/192130 A1 | 12/2014 |
| WO | 2015/011939 A1 | 1/2015 |

OTHER PUBLICATIONS

Communication dated Nov. 14, 2019 from Indian Patent Office in counterpart IN Application No. 201747035913.
Extended European Search Report dated Nov. 30, 2018 issued by the European Patent Office in counterpart application No. 15889863.5.
International Search Report of PCT/JP2015/062276 dated Jul. 21, 2015.

\* cited by examiner (a) Wib=Wia (b) Wib>Wia

ROTARY ELECTRIC MACHINE AND ELECTRIC POWER STEERING APPARATUS

CROSS REFERENCE TO RELATED APPLICATIONS

This application is a National Stage of International Application No. PCT/JP2015/062276 filed Apr. 22, 2015, the contents of which are incorporated herein by reference in its entirety.

TECHNICAL FIELD

The present invention relates to a rotary electric machine and an electric power steering apparatus, and particularly relates to a construction for vibration reduction and noise reduction in a rotary electric machine that uses a stator core that is formed such that tip portions of adjacent teeth are linked together by magnetic bodies.

BACKGROUND ART

When rotary electric machines that use stator cores that are formed such that tip portions of adjacent teeth are linked together by magnetic bodies are driven, nonuniform torque arises due to the magnetic bodies that link together the tip portions of the adjacent teeth, and one problem has been that torque pulsation and cogging torque increase, increasing vibration and noise.

In consideration of such conditions, conventional rotary electric machines have been proposed in which notched grooves that are parallel to a rotating shaft are formed on rotor-facing surfaces of respective teeth, and varying positions of formation of the notched grooves on the rotor-facing surfaces of adjacent teeth are also varied, to reduce vibration and noise in rotary electric machines that result from torque pulsation and cogging torque (see Patent Literature 1, for example).

CITATION LIST

Patent Literature

Patent Literature 1: Japanese Patent Laid-Open No. 2005-094901 (Gazette)

SUMMARY OF THE INVENTION

Problem to be Solved by the Invention

However, in the conventional rotary electric machine that is described in Patent Literature 1, because the positions of formation of the notched grooves on the rotor-facing surface of the teeth that are arranged circumferentially are nonuniform, one problem has been that harmonic components of permeance arise in magnetic air gap portions of the rotary electric machine, preventing torque pulsation and cogging torque from being reduced sufficiently.

The present invention aims to solve the above problems and an object of the present invention is to provide a rotary electric machine and an electric power steering apparatus that can enable reductions in vibration and noise while increasing rigidity of a stator by linking together tip portions of adjacent teeth using magnetic bodies.

Means for Solving the Problem

A rotary electric machine according to the present invention including: a stator including: a stator core that is configured by laminating in an axial direction a plurality of core sheets that are made of a magnetic material; and a stator winding that is mounted to the stator core; and a rotor that is disposed coaxially inside the stator so as to have a magnetic air gap interposed, the rotor having a plurality of field poles. The plurality of core sheets each include: an annular core back portion; a plurality of tooth portions that are arranged at a uniform angular pitch in a circumferential direction such that each protrudes radially inward from the core back portion; slot portions that are formed between adjacent teeth; and flange portions that protrude circumferentially from a protruding end of each of the tooth portions, the plurality of core sheets include linked core sheets that include linking portions that protrude circumferentially from the flange portions so as to link together tip portions of the adjacent tooth portions, at least one sheet of the linked core sheets is formed such that a tooth tip portion shape is mirror-asymmetrical relative to a tooth central axis that passes through a circumferential center of the tooth portions, and the stator core is configured by laminating the linked core sheets such that circumferential positions of the linking portions are offset.

Effects of the Invention

According to the present invention, because the plurality of core sheets that constitute the stator core include linked core sheets that include linking portions that protrude circumferentially from the flange portions so as to link together tip portions of the adjacent tooth portions, rigidity on a radially inner side of the stator core is increased, increasing overall rigidity of the stator. In addition, because at least one sheet of the linked core sheets is formed such that a tooth tip portion shape is mirror-asymmetrical relative to a tooth central axis that passes through a circumferential center of the tooth portions, and the stator core is configured by laminating the linked core sheets such that circumferential positions of the linking portions are offset, torque pulsation due to magnetic saturation in the linking portions is reduced, enabling vibration and noise in the rotary electric machine to be reduced.

DESCRIPTION OF EMBODIMENTS

Before describing the embodiments, an electric driving apparatus that uses a rotary electric machine according to the present invention, and an automobile electric power steering apparatus to which that driving apparatus is mounted, will be explained.

Figure 25:
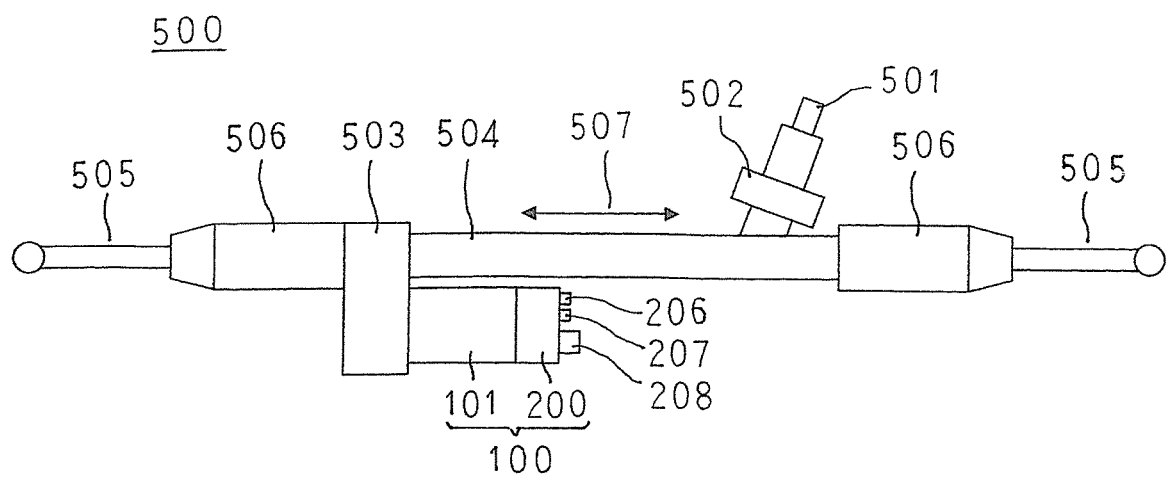
FIG. 25 is an explanatory diagram for an automobile electric power steering apparatus according to Embodiment 11 of the present invention.

First, the electric power steering apparatus will be explained with reference to FIG. 25. FIG. 25 is an explanatory diagram for an automobile electric power steering apparatus according to Embodiment 11 of the present invention.

When a driver steers a steering wheel (not shown), torque therefrom is transmitted to a shaft 501 by means of a steering column (not shown). Here, the torque that is transmitted to the shaft 501 is detected by a torque sensor 502, and is converted into electrical signals, which are transmitted through cables (not shown) to an electronic control unit (ECU) 200 by means of a first connector 206 of an electric driving apparatus 100. The ECU 200 includes a controlling circuit board, and an inverter circuit for driving a rotary electric machine 101.

At the same time, vehicle information such as vehicle speed is converted to electrical signals, which are transmitted to the ECU 200 by means of a second connector 207. The ECU 200 computes the required assisting torque from that torque and the vehicle information such as the vehicle speed, and supplies electric current to the rotary electric machine 101 via an inverter circuit.

The rotary electric machine 101 is disposed such that a central axis is oriented parallel to a direction of movement 507 of a rack shaft. Electric power supply to the ECU 200 is fed by means of an electric power supply connector 208 from a battery or an alternator. Torque that is generated by the rotary electric machine 101 is reduced by a gear box 503 into which belts (not shown) and ball screws (not shown) are mounted internally, to generate thrust that moves the rack shaft (not shown) that is inside the housing 504 in the direction of the arrows to assist the steering force of the driver. Tie rods 505 thereby move, enabling the tires to be steered and the vehicle turned. Moreover, a rack boot 506 is disposed so as to prevent foreign matter from entering the apparatus. Furthermore, the rotary electric machine 101 and the ECU 200 are integrated to constitute the electric driving apparatus 100.

Figure 1:
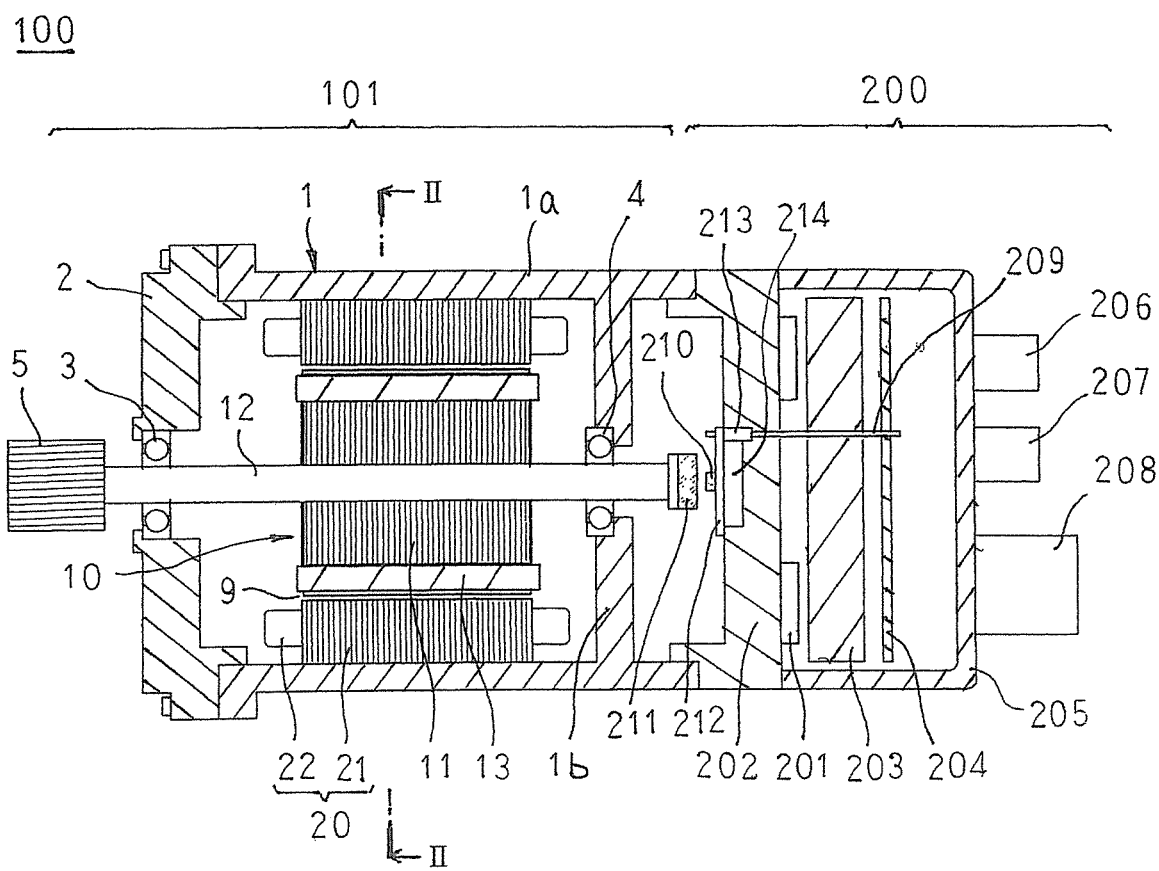
FIG. 1 is a longitudinal cross section that shows an electric driving apparatus according to the present invention.

Next, an electric driving apparatus will be explained with reference to FIG. 1. FIG. 1 is a longitudinal cross section that shows an electric driving apparatus according to the present invention. Moreover, a "longitudinal cross section" is a cross section in a plane that includes a central axis of a rotating shaft of the rotary electric machine.

The electric driving apparatus 100 is configured such that the rotary electric machine 101 and the ECU 200 are arranged in an axial direction of the rotary electric machine 101 and integrated.

The rotary electric machine 101 includes: an annular stator 20; and a rotor 10 that is coaxially and rotatably disposed inside the stator 20 so as to have a magnetic air gap portion 9 interposed.

The stator 20 includes: an annular stator core 21 that is produced by laminating and integrating core sheets; and a stator winding 22 that is mounted to the stator core 21. The stator 20 is held in a floored cylindrical frame 1 by the stator core 21 being fixed so as to be fitted inside a cylindrical portion 1a of the frame 1 by press-fitting or shrinkage-fitting, etc. The rotor 10 includes: a rotor core 11 that is fixed to a rotating shaft 12 that is passed through a central position; and permanent magnets 13 that are fixed to an outer circumferential surface of the rotor core 11. The rotor 10 is disposed coaxially and rotatably inside the stator 20 such that the rotating shaft 12 is supported by bearings 3 and 4 that are disposed in a housing 2 that closes an opening of the frame 2 and in a floor portion 1b of the frame 1. A pulley 5 is mounted to a portion of the rotating shaft 12 that protrudes from the housing 2. A sensor permanent magnet 211 is disposed on an end of the rotating shaft 12 that protrudes from the floor portion 1b.

Here, the core sheets are magnetic bodies such as thin plate-shaped electromagnetic steel sheets. The housing 2 is fixed to the cylindrical portion 1a of the frame 1 by fastening using bolts 6. The permanent magnets 13 are fixed to the outer circumferential surface of the rotor core 11, but may be embedded circumferentially around the rotor core 11.

Disposed in the ECU 200 are: a first connector 206 that receives the signals from the torque sensor 502; a second connector 207 that receives the vehicle information such as the vehicle speed; and an electric power supply connector 208 for supplying electric power. In addition, the ECU 200 includes an inverter circuit for driving the rotary electric machine 101, and the inverter circuit has switching elements 201 such as metal oxide semiconductor field-effect transistors (MOSFETs).

These switching elements 201 have configurations in which bare chips are mounted to direct bonded copper (DBC) circuit boards or configurations in which bare chips are molded using a resin to form power modules, for example. The switching elements 201 generate heat because electric current for driving the rotary electric machine 101 flows therethrough. Thus, the switching elements 201 have a construction in which heat generated is radiated by being placed in contact with a heatsink 202 so as to have an adhesive or insulating sheets interposed. In addition to the switching elements 201, the inverter circuit has parts such as smoothing capacitors, coils for noise reduction, electric power supply relays, busbars that connect these electrically, etc., but these have been omitted from FIG. 1. The busbars are molded integrally with a resin to form intermediate members 203.

A controlling circuit board 204 is disposed so as to be adjacent to the intermediate member 203. This controlling circuit board 204 sends controlling signals to the switching elements 201 in order to drive the rotary electric machine 101 appropriately based on the information that is received through the first and second connectors 206 and 207. The controlling signals are transmitted by connecting members 209 that electrically connect the controlling circuit board 204 and the switching elements 201. These connecting members 209 are connected to the controlling circuit board 204 and the switching elements 201 by press-fitting, or soldering, etc. The inverter circuit and the controlling circuit board 204 are covered by a case 205. The case 205 may be made of a resin, or may be made of a metal such as aluminum, etc., or may have a configuration in which a resin and a metal such as aluminum, etc., are combined. The controlling circuit board 204 is disposed so as to lie in a plane that is perpendicular to a central axis of the rotating shaft 12 of the rotary electric machine 101.

The sensor portion is disposed on a side of the heatsink 202 near the rotary electric machine 101. The sensor portion has a magnetic sensor 210, a circuit board 212, a connecting member 209, and a supporting portion 213, and the circuit board 212, to which the magnetic sensor 210 is mounted, is fixed to the heatsink 202 by fastening using screws (not shown).

The magnetic sensor 210 is disposed at a position that is coaxial with and faces the sensor permanent magnet 211, and detects a magnetic field that is generated by the sensor permanent magnet 211 to detect an angle of rotation of the rotor 10 of the rotary electric machine 101 by finding the orientation thereof. The ECU 200 supplies an appropriate driving current to the rotary electric machine 101 in response to this detected angle of rotation. In addition, the connecting member 209 is supported by the supporting portion 213, and connects the circuit board 212 of the sensor portion and the controlling circuit board 204 electrically. The connecting member 209 is connected to the circuit board 212 and the controlling circuit board 204 by press-fitting, or soldering, etc. Moreover, because it is necessary for the connecting member 209 to pass through the heatsink 202 and the intermediate member 203, penetrating apertures (not shown) through which the connecting member 209 passes are disposed on the heatsink 202 and the intermediate member 203. In addition, although not shown, the intermediate member 203 is configured such that a guide that can position the connecting member 209 is disposed thereon.

Now, in FIG. 1, an example is shown in which the magnetic sensor 210 is mounted onto the circuit board 212, which is separate from the controlling circuit board 204, but the magnetic sensor 210 may be constructed so as to be mounted onto the controlling circuit board 204 so as to detect magnetic flux that leaks through the heatsink 202 from the sensor permanent magnet 211. The intermediate member 203 and the controlling circuit board 204 are arranged sequentially in order of the intermediate member 203, then the controlling circuit board 204, from a side near the rotary electric machine 101, but may be arranged sequentially in order of the controlling circuit board 204, then the intermediate member 203, from the side near the rotary electric machine 101. The rotation sensor is constituted by the magnetic sensor 210 and the sensor permanent magnet 211, but the rotation sensor may be constituted by a resolver. Recess portions 214 are disposed on the heatsink 202 to increase a distance between the magnetic sensor 210 that is mounted onto the circuit board 212 and the front surface of the heatsink 202. Because the heatsink 202 is fixed to the frame 1 of the rotary electric machine 101 by screws or shrinkage-fitting, etc., heat generated by the switching elements 201 can be transferred to the frame 1 of the rotary electric machine 101 through the heatsink 202.

Embodiment 1

Figure 2:
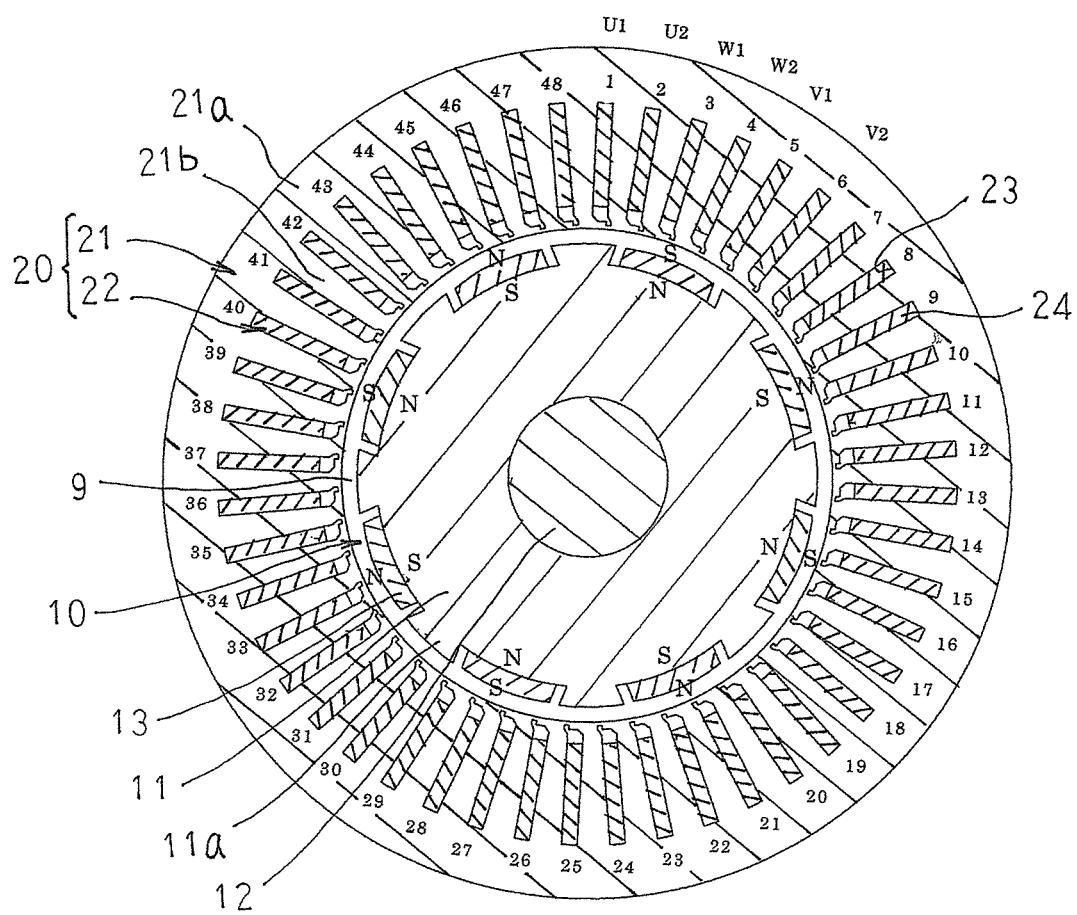
FIG. 2 is a cross section that is taken along Line II-II in FIG. 1 so as to be viewed in the direction of the arrows that shows a configuration of a rotary electric machine according to Embodiment 1 of the present invention.

FIG. 2 is a cross section that is taken along Line II-II in FIG. 1 so as to be viewed in the direction of the arrows that shows a configuration of a rotary electric machine according to Embodiment 1 of the present invention. Moreover, in FIG. 2, 1, 2, 3, etc., through 48 are slot numbers that have been allotted to the slots in order of circumferential arrangement for convenience. Furthermore, for simplicity, a frame is omitted from FIG. 2, and only rectilinear portions of coil segments of a stator winding are shown.

In FIG. 2, a rotor 10 is rotatably disposed inside a stator 20 so as to have the magnetic air gap portion 9 interposed. Eight permanent magnets 13 are disposed on the outer circumferential surface of the rotor core 11 at a uniform angular pitch in a circumferential direction. Polarities of adjacent permanent magnets 13 are magnetized so as to be mutually opposite, and the number of poles in the rotor 10 is eight poles. Portions of the rotor core 11 between the permanent magnets 13 protrude radially outward, and air gap portions are formed between those protruding portions 11a and the permanent magnets 13. These air gap portions are nonmagnetic magnetic air gap portions to reduce magnetic leakage flux. These protruding portions 11a are effective in reducing the magnetic air gap portion 9 of the rotary electric machine 101, and increase inductance. It thereby becomes easier for flux-weakening control to exhibit effects, enabling torque during high-speed rotation to be improved.

Moreover, disposing aperture portions on the rotor core 11 is effective in reducing weight and in reducing inertia.

The stator core 21 has: an annular core back 21a; and forty-eight teeth 11b that each protrude radially inward from an inner circumferential surface of the core back 21a, and that are arranged at a uniform angular pitch circumferentially. Teeth 21b are formed so as to have a tapered shape in which a circumferential width becomes gradually narrower toward a radially inner side, and slots 23 that have an approximately rectangular cross section are formed between adjacent teeth 21b. A stator winding 22 is housed in the slots 23. Although not shown, insulating papers are inserted between the stator winding 22 and the stator core 21 to ensure electrical insulation.

The stator winding 22 is constituted by: a three-phase winding that includes a U1-phase winding, a V1-phase winding, and a W1-phase winding; and a three-phase winding that includes a U2-phase winding, a V2-phase winding, and a W2-phase winding. The U1-phase winding is a winding that is housed in the slots 23 at Slot Numbers 1, 7, 13, etc., through 43, the U2-phase winding is a winding that is housed in the slots 23 at Slot Numbers 2, 8, 14, etc., through 44, the V1-phase winding is a winding that is housed in the slots 23 at Slot Numbers 3, 9, 15, etc., through 45, the V2-phase winding is a winding that is housed in the slots 23 at Slot Numbers 4, 10, 16, etc., through 46, the W1-phase winding is a winding that is housed in the slots 23 at Slot Numbers 5, 11, 17, etc., through 47, and the W2-phase winding is a winding that is housed in the slots 23 at Slot Numbers 6, 12, 18, etc., through 48.

The U1-phase winding is constituted by eight coil segments 24 that each form a single turn. The coil segments 24 are configured so as to have a U shape that includes: a pair of rectilinear portions that are housed in the slots 23 on two sides of six teeth 21b that line up continuously in a circumferential direction; a return portion that links together first ends of the pair of rectilinear portions; and a pair of coil terminals that extend outward at a second end from the pair of rectilinear portions. The coil segments 24 are mounted individually from a vicinity of the first end in the axial direction of the stator core 21 into the pair of slots 23 at Slot Numbers 1 and 7, the pair of slots 23 at Slot Numbers 7 and 13, etc., through the pair of slots 23 at Slot Numbers 37 and 43, and the pair of slots 23 at Slot Numbers 43 and 1, respectively. The eight coil segments 24 that are mounted into the stator core 21 are connected in series by joining together the coil terminals of the adjacent coil segments 24 that protrude outward at the second axial end of the stator core 21 by welding to form the U1-phase winding. Here, the eight coil segments 24 are connected so that the direction of the electric currents that flows through adjacent coil segments 24 is reversed. Moreover, because the V1-phase winding, the W1-phase winding, the U2-phase winding, the V2-phase winding, and the W2-phase winding are configured in a similar or identical manner to that of the U1-phase winding, explanation thereof will be omitted here.

In this case, a case in which one coil segment 24 is housed in each of the pairs of slots 23 on the two sides of the six teeth 21b that line up continuously in the circumferential direction has been explained, but the number of coil segments 24 that are housed in each of the slots 23 may be two or more. If two coil segments 24 are housed in each of the pairs of slots 23, for example, then a two-turn coil is formed by connecting the two coil segments 24 that are inserted into an identical pair of slots 23 in series. The U1-phase winding, the V1-phase winding, the W1-phase winding, the U2-phase winding, the V2-phase winding, and the W2-phase winding are each configured by connecting in series eight two-turn coils that are configured in this manner.

The rotary electric machine 101 that is configured in this manner has an eight-pole forty-eight-slot configuration. The stator winding 22 is constituted by distributed windings that are mounted into the slots 23 so as to span six teeth 21b. Because this corresponds to 180 electrical degrees, and represents a short-pitch winding coefficient of 1, magnetic flux that is generated by the permanent magnets 13 can be used effectively, enabling reductions in size and increases in torque to be achieved in the rotary electric machine 101. Use of the permanent magnets 13 in the rotary electric machine 100 can thereby be reduced compared to rotary electric machines that have a smaller short-pitch winding coefficient, enabling reductions in cost to be achieved.

As described below, the stator core 21 is produced by laminating and integrating first linked core sheets 30 in which tip portions of the adjacent tooth portions 30b are linked together by linking portions so as to be configured into a closed-slot core. The stator winding 22 is constituted by coil segments 24 that are formed so as to have a U shape. Because the coil segments 24 can be inserted into the closed-slot stator core 21 from an axial direction, manufacturing of the stator 20 is facilitated. Because it is not necessary to divide the stator core 21 into segments, increased torque can be achieved in the rotary electric machine 101, and the occurrence of torque pulsation that results from dividing the stator core 21 into segments can also be suppressed.

Figure 3:
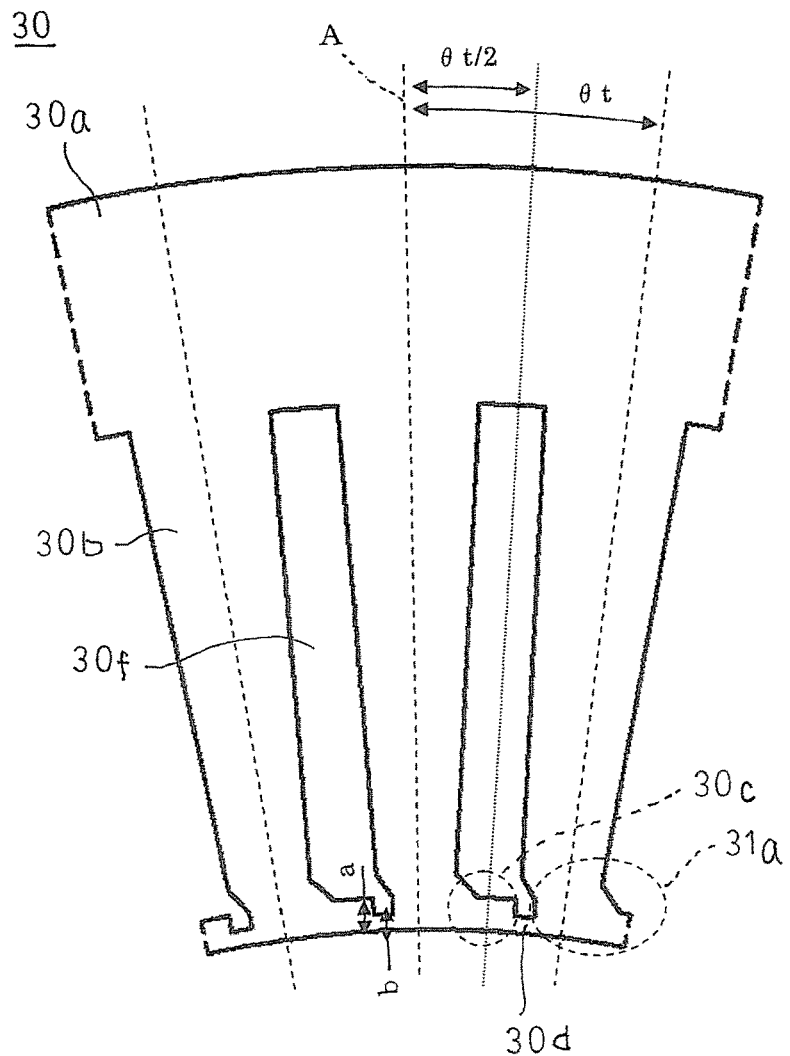
FIG. 3 is a plan that shows part of a first linked core sheet that constitutes part of a stator core in the rotary electric machine according to Embodiment 1 of the present invention.

Next, the first linked core sheets 30 will be explained in detail with reference to FIG. 3. FIG. 3 is a plan that shows part of a first linked core sheet that constitutes part of a stator core in the rotary electric machine according to Embodiment 1 of the present invention. Moreover, FIG. 3 shows a model portion representing one sixteenth in a circumferential direction. In FIG. 3, A is a plane that passes through a circumferential center of a tooth portion and a central axis of a rotating shaft (hereinafter called "a tooth central axis").

The first linked core sheets 30 are produced by punching sheets of electromagnetic steel plate, for example, and have: an annular core back portion 30a; tapered tooth portions 30b that are arranged at a pitch angle of θt in a circumferential direction such that each protrudes radially inward from an inner circumferential surface of the core back portion 30a; flange portions 30c that protrude in a first circumferential direction from tips of the tooth portions 30b; linking portions 30d that link the flange portions 30c and the tips of the tooth portions 30b that are positioned in the first circumferential direction; and slot portions 30f that are formed between the tooth portions 30b. The shapes of the respective tooth tip portions 31a are identical, and have a mirror-asymmetrical shape relative to the tooth central axis A. The flange portions 30d are formed so as to have a range that exceeds θt/2 in the first circumferential direction from the tooth central axis A. The inner circumferential surfaces of the first linked core sheets 30 are formed into a cylindrical surface that is centered around a central axis of the rotating shaft 12. A radial width b of the linking portions 30d is narrower than a radial width a of the flange portions 30c. Moreover, the tooth tip portions 31a are portions that include vicinities of the tips of the tooth portions 30b and the flange portions 30c.

Moreover, a radial width of the linking portions 30d becomes narrower from the flange portions 30c in a stepped pattern, but the radial width of the linking portions 30d need only be narrower than the radial width of the flange portions 30c, and radially outer surfaces of the linking portions 30 may be formed so as to have convexly curved surfaces on a radially inner side, for example.

If the number of teeth 21b is Ns, then the pitch angle θt of the tooth portions 30b is expressed by Expression (1).

$$\theta t = 360°/Ns \quad (1)$$

In Embodiment 1, because the number of teeth 21b is forty-eight, θt=7.5°.

In a comparative stator core that is produced by laminating and integrating first linked core sheets 30 that have been configured in this manner in an identical direction, flanges that are configured by laminating and integrating the flange portions 30c are formed only in the first circumferential direction on teeth that are produced by laminating and integrating the tooth portions 30b. The linking portions that are produced by laminating and integrating the linking portions 30d link together the flanges and the vicinities of the tips of the teeth. In addition, the radial width of the linking portions is narrower than the radial width of the flanges. In a rotary electric machine that uses the comparative stator core that is produced by laminating and integrating the first linked core sheets 30, magnetic leakage flux inside the stator that does not contribute to torque can thereby be reduced, enabling increased torque to be achieved in the rotary electric machine.

However, when a rotary electric machine that uses the comparative stator core is driven, magnetic saturation arises in the linking portions. Because magnetic saturation in the linking portions changes depending on the position of the rotor and the phase of the electric current passed to the stator winding, irregularities arise in the torque in the rotary electric machine in particular, increasing torque pulsation. Problems thereby arise such as vibration and noise increasing in the rotary electric machine.

Figure 4:
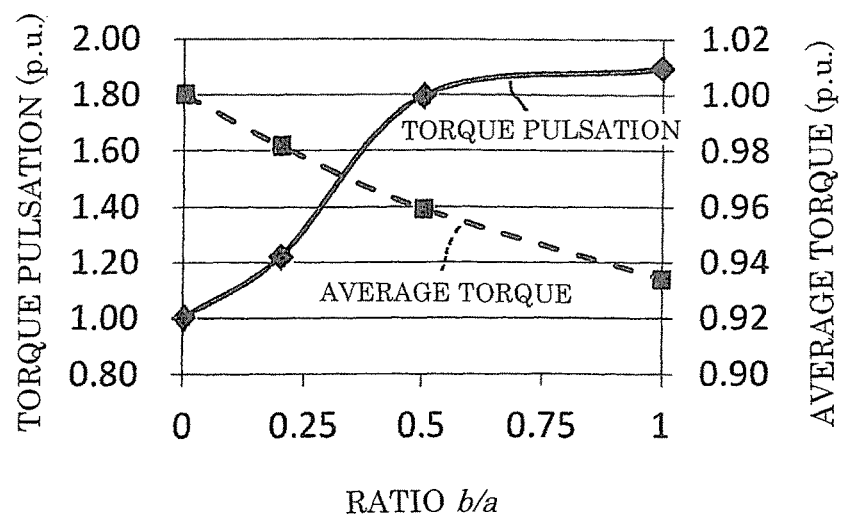
FIG. 4 is a graph that shows torque pulsation and average torque relative to a ratio between radial width of a flange and radial width of a linking portion.

Now, torque pulsation and average torque were measured with different ratios between b/a of the radial width of the linking portions relative to the radial width of the flanges in the comparative stator core, the results being shown in FIG. 4. FIG. 4 is a graph that shows torque pulsation and average torque relative to the ratio between radial width of a flange and radial width of a linking portion. Moreover, b/a=0 is a case when there are no linking portions.

From FIG. 4, it can be seen that when the tooth tip portions 31a are linked by the linking portions 30d, torque pulsation increases, and average torque decreases.

Figure 5:
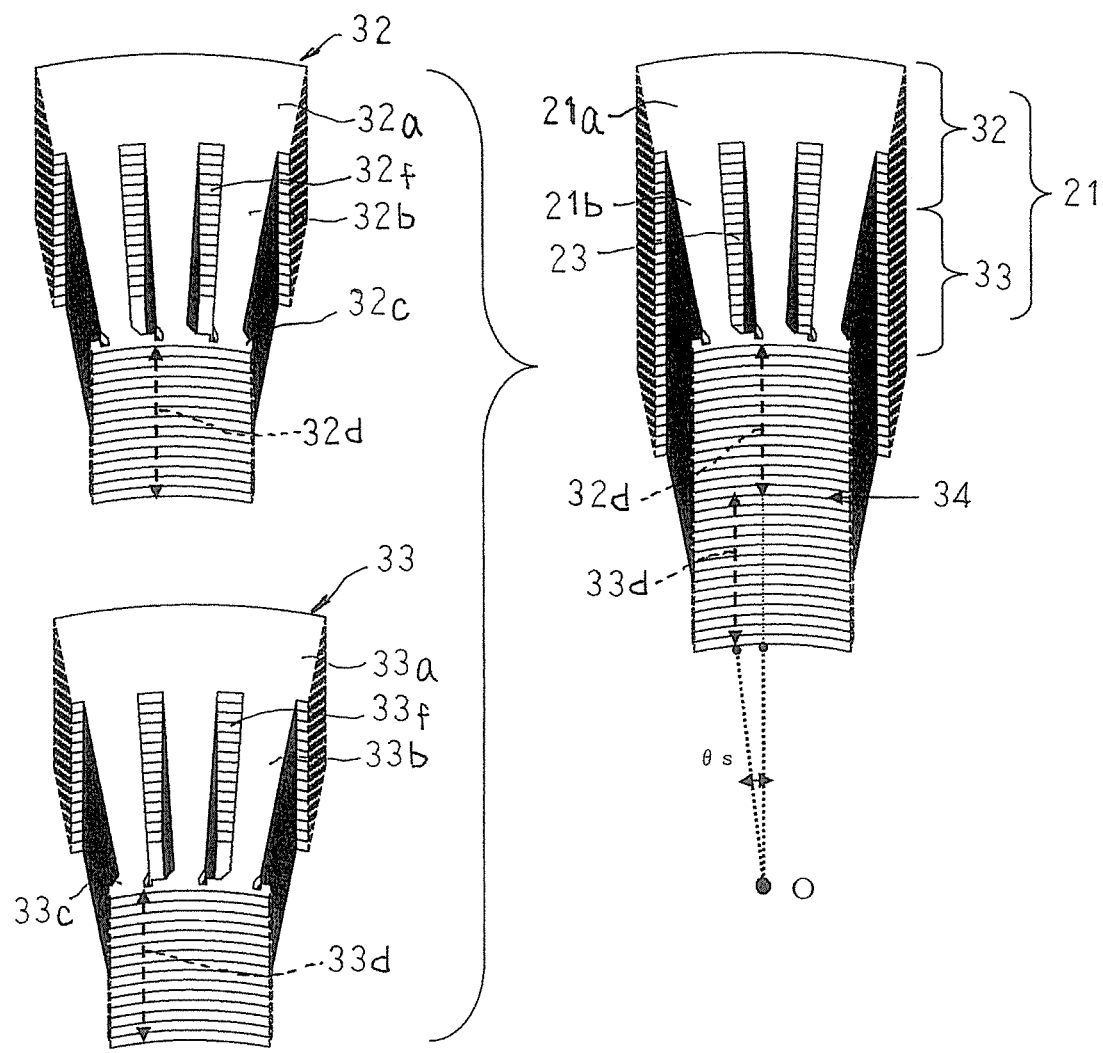
FIG. 5 is a diagram that explains a construction of the stator core in the rotary electric machine according to Embodiment 1 of the present invention.

Next, construction of the stator core 21 according to Embodiment 1 will be explained with reference to FIG. 5. FIG. 5 is a diagram that explains a construction of the stator core in the rotary electric machine according to Embodiment 1 of the present invention.

In FIG. 5, a first core block 32 is produced by laminating fifteen first linked core sheets 30 so as to be oriented in an identical direction, and integrating them by crimping or gluing, etc. The core back portions 30a are laminated and integrated to form a core back 32a, the tooth portions 30b are laminated and integrated to form teeth 32b, the flange portions 30c are laminated and integrated to form flanges 32c, the linking portions 30d are laminated and integrated to form linking portions 32d, and the slot portions 30f are laminated to form slot portions 32f.

A second core block 33 is produced by laminating fifteen first linked core sheets 30 so as to be oriented in an identical direction such that front and back surfaces are reversed compared to the first linked core sheets 30 in the first core block 32, and integrating them by crimping or gluing, etc. The core back portions 30a are laminated and integrated to form a core back 33a, the tooth portions 30b are laminated and integrated to form teeth 33b, the flange portions 30c are laminated and integrated to form flanges 33c, the linking portions 30d are laminated and integrated to form linking portions 33d, and the slot portions 30f are laminated to form slot portions 33f.

Then the stator core 21 is produced by laminating the first core block 32 and the second core block 33, and integrating them by crimping or gluing, etc., at a block boundary surface 34. The core backs 32a and 33a are laminated and integrated to form the core back 21a, the teeth 32b and 33b are laminated and integrated to form the teeth 21b, and the slot portions 32f and 33f are laminated to form the slots 23.

In the stator core 21 that is configured in this manner, positions of the linking portions 32d of the first core block 32 and the linking portions 33d of the second core block 33 are offset at the block boundary surface 34 by an angular difference of θs degrees in a circumferential direction in a plane that is perpendicular to the central axis of the rotating shaft 12 using a point on the central axis of the rotating shaft 12 as an origin.

Because this stator core 21 is configured by laminating first linked core sheets 30 that are all identical, manufacturing is facilitated.

When a rotary electric machine 101 that uses this stator core 21 is driven, radial electromagnetic forces that act to warp the stator 20 toward an inner circumferential side act on the inner circumferential side of the stator 20. Because the stator core 21 is linked by the linking portions 32d and 33d between the tips of the teeth 21b, rigidity on the inner circumferential side of the stator core 21 is increased. The generation of vibration and noise in the rotary electric machine 101 is thereby suppressed. Because openings of the slots 23 are eliminated, ejection of the stator winding 22 toward the inner circumferential side of the stator core 21 is prevented. Because high-frequency components of slot permeance that cause cogging torque and electromagnetic vibrational forces are reduced, cogging torque and electromagnetic vibrational forces can be reduced. In addition, because the linking portions 32d and 33d form pathways for magnetic flux, inductance of the rotary electric machine 101 increases, making it possible to strengthen the effects of field-weakening control. Voltage saturation can thereby be alleviated, enabling average torque in the rotary electric machine 101 during high-speed rotation to be improved.

Figure 6:
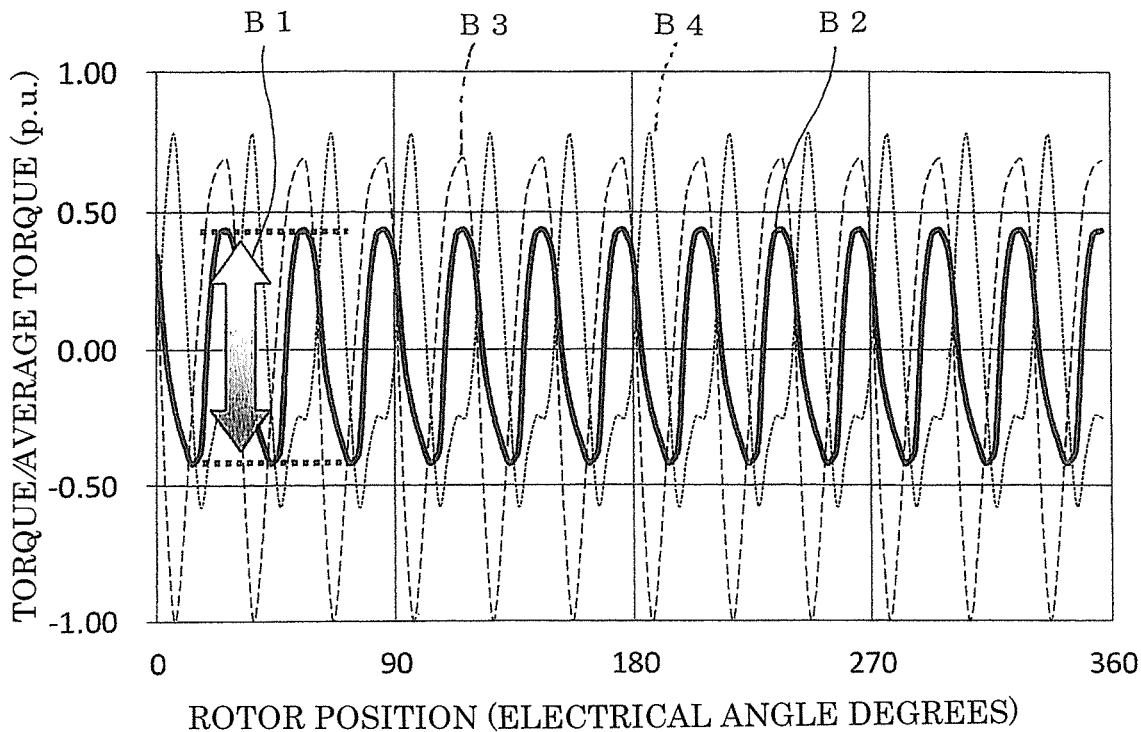
FIG. 6 is a graph that shows torque waveforms and torque pulsation in the rotary electric machine according to Embodiment 1 of the present invention.

Next, torque waveforms and torque pulsation in the rotary electric machine 101 were measured, the results being shown in FIG. 6. FIG. 6 is a graph that shows torque waveforms and torque pulsation in the rotary electric machine according to Embodiment 1 of the present invention. Moreover, in FIG. 6, B1 is torque pulsation in the rotary electric machine 101, B2 is a torque waveform of the rotary electric machine 101, B3 is a torque waveform that arises in a cross section that includes the first core block 32, and B4 is a torque waveform that arises in a cross section that includes the second core block 33. The vertical axis is standardized such that the average value of each of the torque waveforms is "0", and the minimum value of torque pulsation that arises in the cross section that includes the first core block 32 is "−1.0", for torque values relative to the average torque of the rotary electric machine 101. Moreover, the average torque of the rotary electric machine 101 is the average torque value of the entire rotary electric machine 101, not for each cross section. In other words, all of the denominators are identical.

It can be seen from FIG. 6 that in the rotary electric machine 101, torque pulsation in the cross section that includes the first core block 32 and torque pulsation in the cross section that includes the second core block 33 are mutually canceled out, and torque pulsation B1 is less than the torque pulsation that arises in each of the cross sections. This can be inferred to be because the phases of the torque waveforms B3 and B4 that arise due to the linking portions 32d and 33d have a mutual phase difference due to the positions of the linking portions 32d and 33d being offset by an angular difference of θs degrees circumferentially. Furthermore, it can be seen that the electrical angle twelfth-order component of torque pulsation is smaller particularly when the angle that pairs of North-seeking (N) poles and South-seeking (5) poles of the rotor 10 occupy in a circumferential direction is made 360 electrical degrees.

Thus, according to Embodiment 1, because the positions of the linking portions 32d and 33d are arranged so as to be offset from each other in a circumferential direction, torque pulsation that arises in the linking portions 32d and 33d can be canceled out, enabling torque pulsation that arises in the rotary electric machine 101 to be reduced. Effects that enable vibration and noise to be reduced in the rotary electric machine 101 can thereby be achieved.

Figure 7:
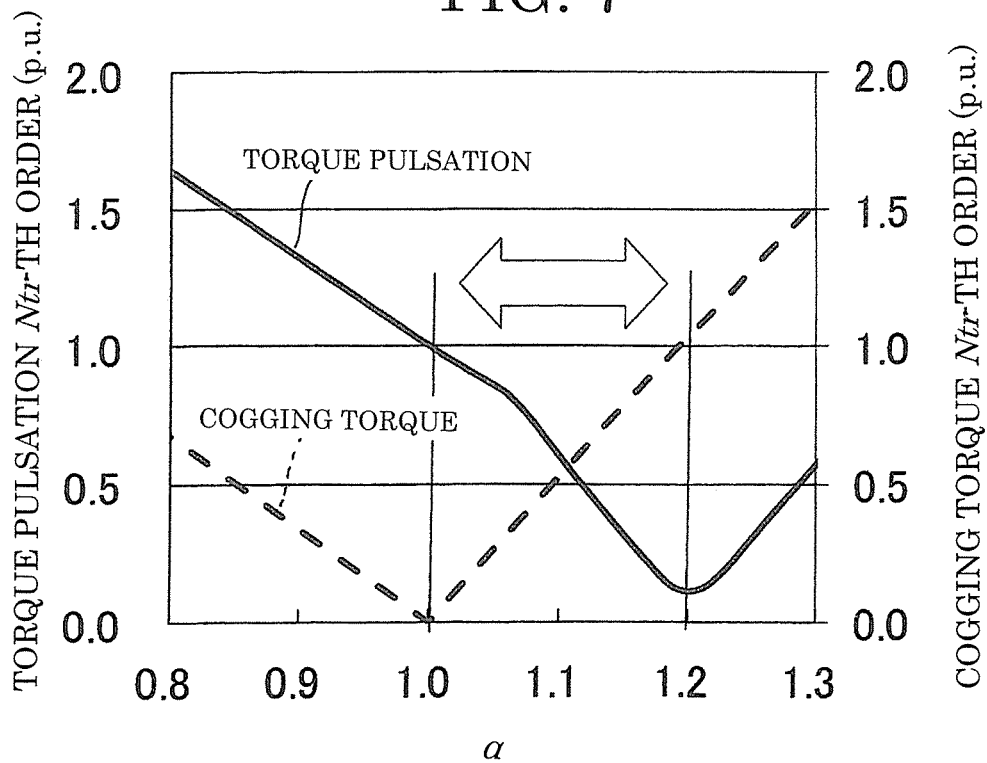
FIG. 7 is a graph that shows standardized values for twelfth-order torque pulsation and twelfth-order cogging torque when an angular difference of θs degrees is 3 degrees through 4.875 degrees in the rotary electric machine according to Embodiment 1 of the present invention.

Next, standardized values for twelfth-order torque pulsation and twelfth-order cogging torque when an angular difference of θs degrees is 3 degrees through 4.875 degrees in the rotary electric machine 101 are shown in FIG. 7. FIG. 7 is a graph that shows standardized values for twelfth-order torque pulsation and twelfth-order cogging torque when an angular difference of θs degrees is 3 degrees through 4.875 degrees in the rotary electric machine according to Embodiment 1 of the present invention. Here, a horizontal axis in FIG. 7 is a. If the number of magnetic field poles is p, and the order of torque pulsation is Ntr, then a is expressed by Expression (2).

$$a = \theta s / (360 / Ntr/p) \quad (2)$$

In other words, a is the angular difference of θs degrees standardized by the number of magnetic field poles and the order of torque pulsation. This is because the effects that cancel out torque pulsation can also be obtained under different numbers of magnetic field poles and orders of torque pulsation if the angular difference is determined based on the order of the torque pulsation. Now, in Embodiment 1, because p=8, a is 0.8 through 1.3 when the angular difference of θs is set to 3 degrees through 4.875 degrees. Furthermore, a vertical axis in FIG. 7, represents a standardized Ntr-th order (twelfth order) of cogging torque and a standardized Ntr-th order (twelfth order) of torque pulsation. Here, the cogging torque is a force with which the permanent magnets 13 of the rotor 10 and the stator core 21 of the rotary electric machine 101 pull against each other magnetically, and increases in vibration and noise in the rotary electric machine 101 are of concern when the cogging torque is large.

From FIG. 7, it can be seen that torque pulsation decreases in a region in which a≤1.2 as a increases. Furthermore, torque pulsation decreases as a decreases in a region in which a≥1.2. It was found that cogging torque decreases as a increases in a region in which a≤1.0, and decreases as a decreases in a region in which a≥1.0.

It thereby confirmed that torque pulsation and cogging torque can be reduced by disposing a phase difference of θs. In other words, it was confirmed that effects that can reduce vibration and noise in the rotary electric machine 101 are obtained.

From FIG. 7, it can also be seen that it is desirable to make a greater than or equal to 1.0 and less than or equal to 1.2 in order to reduce both torque pulsation and cogging torque of the Ntr-th order (the twelfth order). In Embodiment 1, because a is set to greater than or equal to 1.0 and less than or equal to 1.2, torque pulsation and cogging torque of the Ntr-th order (the twelfth order) can both be reduced, enabling effects that can further reduce vibration and noise in the rotary electric machine 101 to be achieved.

Moreover, in FIG. 7, a case in which Ntr=12 and p=8 has been shown, but it goes without saying that similar or identical effects can also be achieved under different orders of torque pulsation and numbers of magnetic field poles, provided that θs is determined from a so as to match the order of torque pulsation and the number of magnetic field poles.

At the block boundary surface 34 of the stator core 21 between the first core block 32 and the second core block 33, the tooth tip portions of the first core block 32 and the tooth tip portions of the second core block 33 overlap in an axial direction of the rotating shaft 21. Thus, magnetic flux inside the stator 20 flows axially from tooth tip portions of the second core block 33 to the tooth tip portions of the first core block 32, for example. Because magnetic leakage flux arises in this manner, one problem is that torque decreases in the rotary electric machine 101. This magnetic leakage flux increases as the block boundary surfaces 34 increase in number. In Embodiment 1, because one of each of the first and second core blocks 32 and 33, in which the circumferential positions of the linking portions are different, are laminated to constitute the stator core 21, the block boundary surface 34 is minimized to a single position, enabling the magnetic leakage flux due to the block boundary surface 34 to be reduced, and thereby enabling decreases in torque in the rotary electric machine 101 to be suppressed.

In Embodiment 1, because the radial width b of the linking portions 32d and 33d is less than the radial width a of the flange portions 32c and 33c, average torque can be improved compared to when b/a=1, as can be seen from FIG. 4, enabling the torque pulsation to be reduced.

In addition, from FIG. 7, torque pulsation and cogging torque can be reduced by making a greater than or equal to 1.0 and less than or equal to 1.2. Now, because a=θs/(360/Ntr/p), it is necessary to increase θs relatively significantly in order to reduce low-frequency torque pulsation and cogging torque such as when Ntr is a lower order such as the sixth order or the twelfth order. In Embodiment 1, because the flange portions 30d of the first linked core sheets 30 are made to protrude only in a first circumferential direction from the vicinities of tips of the tooth portions 30b, the angular difference of θs degrees between the linking portions 32d and 33d can be enlarged, enabling the low-frequency torque pulsation to be reduced.

In addition, if the tooth central axis A of each of the tooth portions 30b is 0 degrees, then the shape of the tooth tip portions 31a is a shape that is disposed over an angle that exceeds θt/2 degrees, which is half of the pitch angle θt degrees in the circumferential direction of the tooth portions 30b. The angular difference of θs degrees between the linking portions 32d and 33d can thereby be enlarged, enabling low-frequency torque pulsation and cogging torque to be reduced.

Moreover, in Embodiment 1, linked core sheets were used that had a single mirror-asymmetrical type of tooth tip portion shape, but similar or identical effects can also be achieved if first linked core sheets are used that have two or more mirror-asymmetrical types of tooth tip portion shapes.

In Embodiment 1 above, one of each of two types of core blocks that have linking portions at different circumferential positions are used to minimize the block boundary surface of the stator core to a single position, but similar or identical effects can also be achieved if the two types of core blocks that have linking portions at different circumferential positions are increased in number, and the two types of core blocks are laminated alternately to make two or more block boundary surfaces on the stator core.

In Embodiment 1 above, the stator core is configured by laminating thirty first linked core sheets, but the number of laminated first linked core sheets is not limited to thirty.

In Embodiment 1 above, the numbers of laminated first linked core sheets in the first core block and in the second core block are identical, but similar or identical effects can also be achieved if the numbers of laminated first linked core sheets in the first core block and in the second core block are different.

In Embodiment 1 above, the configuration is such that field poles are generated by disposing permanent magnets on a rotor core, but similar or identical effects can also be achieved if electromagnets that use windings are disposed, or if field poles are disposed using a reluctance rotor, or an inductor rotor.

In Embodiment 1 above, the stator winding is configured using a plurality of coil segments, but similar or identical effects can also be achieved if the stator winding has a different winding construction.

In Embodiment 1 above, the rotary electric machine has an eight-pole forty-eight-slot configuration, but similar or identical effects can also be achieved if a rotary electric machine has a configuration that has a different number of magnetic field poles or a different number of slots.

Embodiment 2

Figure 8:
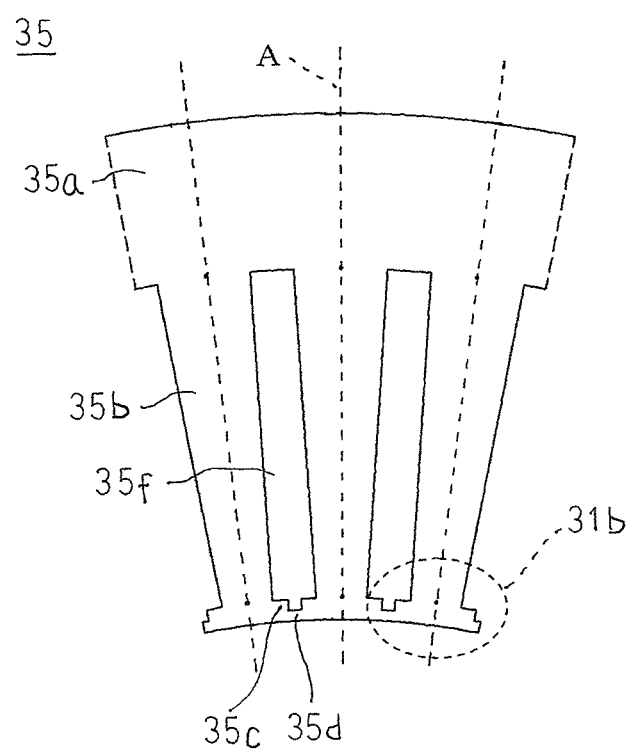
FIG. 8 is a plan that shows a second linked core sheet that constitutes part of a stator core in a rotary electric machine according to Embodiment 2 of the present invention.
Figure 9:
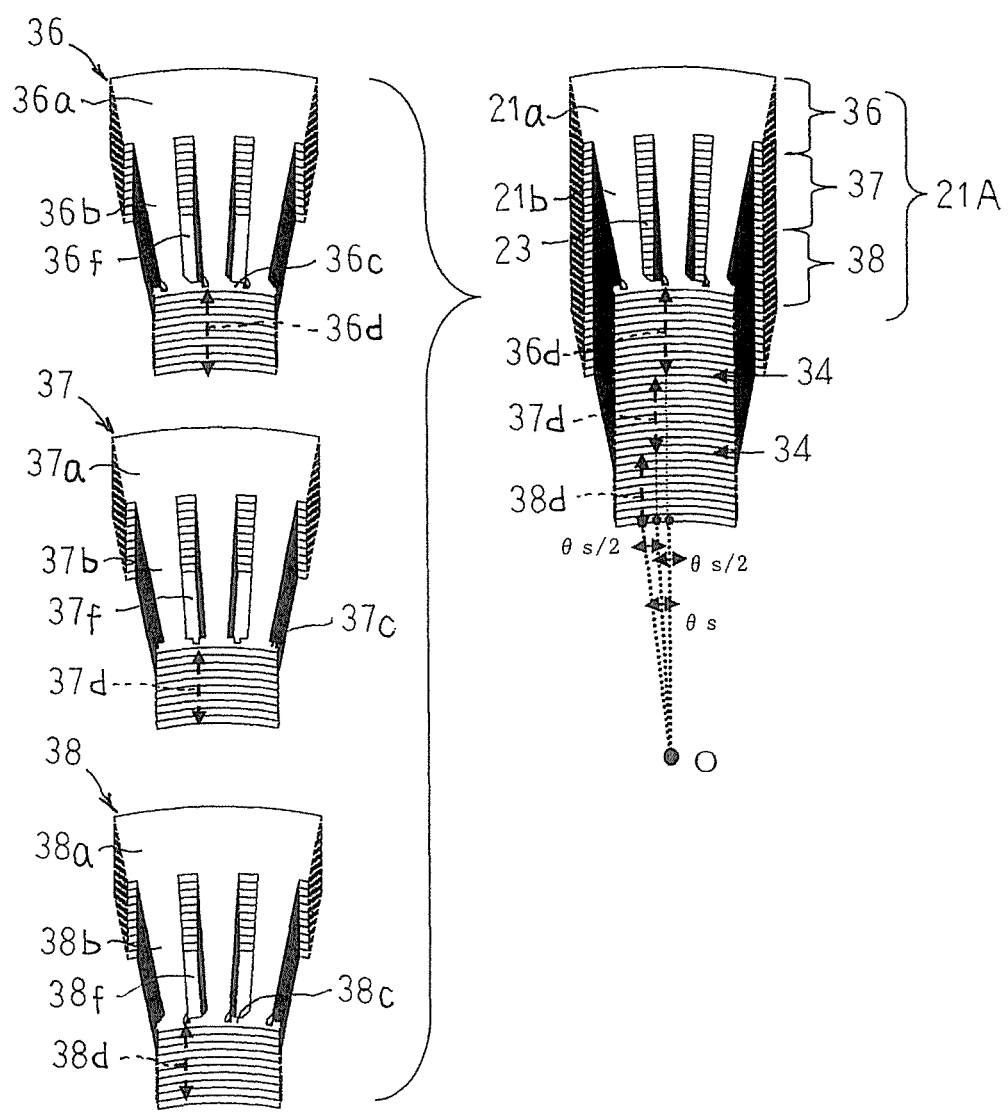
FIG. 9 is a diagram that explains a construction of the stator core in the rotary electric machine according to Embodiment 2 of the present invention.

FIG. 8 is a plan that shows a second linked core sheet that constitutes part of a stator core in a rotary electric machine according to Embodiment 2 of the present invention, and FIG. 9 is a diagram that explains a construction of the stator core in the rotary electric machine according to Embodiment 2 of the present invention. Moreover, FIG. 8 shows a model portion representing one sixteenth in a circumferential direction.

In FIG. 8, second linked core sheets 35 are produced by punching sheets of electromagnetic steel plate, for example, and have: an annular core back portion 35a; tapered tooth portions 35b that are arranged at a pitch angle of θt in a circumferential direction such that each protrudes radially inward from an inner circumferential surface of the core back portion 35a; flange portions 35c that protrude in two circumferential directions from tips of the tooth portions 35b; linking portions 35d that link the flange portions 35c together; and slot portions 35f that are formed between the adjacent tooth portions 35b. A radial width of the linking portions 35d is narrower than a radial width of the flange portions 35c. The shapes of the respective tooth tip portions 31b are identical, and have a mirror-symmetrical shape relative to the tooth central axis A. Moreover, the second linked core sheets 35 are configured in a similar or identical manner to the first linked core sheets 30 except that the shapes of the tooth tip portions 31b is different than the shapes of the tooth tip portions 31a of the first linked core sheets 30.

A stator core 21A according to Embodiment 2 is produced by laminating and integrating a first core block 36, a second core block 37, and a third core block 38, as shown in FIG. 9.

A first core block 36 is produced by laminating ten first linked core sheets 30, and integrating them by crimping or gluing, etc. The core back portions 30a are laminated and integrated to form a core back 36a, the tooth portions 30b are laminated and integrated to form teeth 36b, the flange portions 30c are laminated and integrated to form flanges 36c, the linking portions 30d are laminated and integrated to form linking portions 36d, and the slot portions 35f are laminated to form slot portions 36f.

A second core block 37 is produced by laminating ten second linked core sheets 35, and integrating them by crimping or gluing, etc. The core back portions 35a are laminated and integrated to form a core back 37a, the tooth portions 35b are laminated and integrated to form teeth 37b, the flange portions 35c are laminated and integrated to form flanges 37c, the linking portions 35d are laminated and integrated to form linking portions 37d, and the slot portions 35f are laminated to form slot portions 37f.

A third core block 38 is produced by laminating ten first linked core sheets 30 such that front and back surfaces are reversed compared to the first linked core sheets 30 in the first core block 36, and integrating them by crimping or gluing, etc. The core back portions 30a are laminated and integrated to form a core back 38a, the tooth portions 30b are laminated and integrated to form teeth 38b, the flange portions 30c are laminated and integrated to form flanges 38c, the linking portions 30d are laminated and integrated to form linking portions 38d, and the slot portions 35f are laminated to form slot portions 38f.

Then the stator core 21A is produced by laminating the first core block 36, the second core block 37, and the third core block 38, and integrating them by crimping or gluing, etc., at block boundary surfaces 34. The core backs 36a, 37a, and 38a are laminated and integrated to form a core back 21a, the teeth 36b, 37b, and 38b are laminated and integrated to form teeth 21b, and the slot portions 36f, 37f, and 38f are laminated to form slots 23.

In the stator core 21A that is configured in this manner, positions of the linking portions 36d of the first core block 36, the linking portions 37d of the second core block 37, and the linking portions 38d of the third core block 38 are mutually offset at the block boundary surfaces 34 by an angular difference of θs/2 degrees in a circumferential direction in a plane that is perpendicular to the central axis of the rotating shaft 12 using a point on the central axis of the rotating shaft 12 as an origin.

Moreover, Embodiment 2 is configured in a similar or identical manner to Embodiment 1 above except that the stator core 21A is used instead of the stator core 21.

In Embodiment 2, because the circumferential positions of the linking portions 36d, 37d, and 38d are offset by an angular difference of θs/2 degrees from each other, the phases of the torque pulsation that arises due to the linking portions 36d, 37d, and 38d each have a phase difference from each other. Consequently, among torque pulsation that arises in the rotor 10, the torque pulsation in the portions of the rotor 10 that face the first through third core blocks 36, 37, and 38 that constitute the stator core 21A across the magnetic air gap 9 is mutually canceled out, enabling effects that reduce torque pulsation to be achieved.

In Embodiment 2, the linking portions 36d and 37d of the first and second core blocks 36 and 37 have an angular difference of θs/2 degrees, the linking portions 37d and 38d of the second and third core blocks 37 and 38 have an angular difference of θs/2 degrees, and the linking portions 36d and 38d of the first and third core blocks 36 and 38 have an angular difference of θs degrees. Thus, components of two different orders Ntr1 and Ntr2 of the torque pulsation and the cogging torque that arise due to the linking portions 36d, 37d, and 38d can be reduced. It thereby becomes possible to reduce vibration and noise in the rotary electric machine further.

In Embodiment 2, because one of each of the first, second, and third core blocks 36, 37, and 38, in which the circumferential positions of the linking portions are different, are laminated to constitute the stator core 21A, the block boundary surface 34 is minimized to two positions, enabling the magnetic leakage flux to be reduced, and thereby enabling decreases in torque in the rotary electric machine to be suppressed.

Moreover, in Embodiment 2 above, linked core sheets that had a single mirror-asymmetrical type of tooth tip portion shape and linked core sheets that had a single mirror-symmetrical type of tooth tip portion shape were used, but similar or identical effects can also be achieved if linked core sheets that have two or more mirror-asymmetrical types of tooth tip portion shapes and linked core sheets that have two or more mirror-symmetrical types of tooth tip portion shapes are used.

In Embodiment 2 above, the positions of the linking portions of the first through third core blocks are offset from each other in a circumferential direction by an angular difference of θs/2 degrees at a uniform pitch in a plane that is perpendicular to the central axis of the rotating shaft using a point O on a central axis of a rotating shaft as an origin, but the positions of the linking portions of the first through third core blocks may be offset with nonuniform spacing in a circumferential direction. In that case, effects that can reduce components of three or more different orders of torque pulsation and cogging torque can be achieved.

In Embodiment 2 above, first through third core blocks are each configured by laminating ten first and second linked core sheets, but the number of laminated first and second linked core sheets in the first through third core blocks is not limited to ten.

In Embodiment 2 above, one of each of three types of core blocks that have linking portions at different circumferential positions are used to minimize the block boundary surface of the stator core to two positions, but similar or identical effects can also be achieved if the three types of core blocks that have linking portions at different circumferential positions are increased in number, and the core blocks are laminated such that the different types of core blocks are adjacent to each other to make three or more block boundary surfaces on the stator core.

In Embodiment 2 above, numbers of first and second linked core sheets that are laminated in the first through third core blocks are identical, but the number of laminated first and second linked core sheets in the first through third core blocks may be different.

In Embodiment 2 above, a stator core is configured by laminating three types of core blocks in which circumferential positions of linking portions are different, but similar or identical effects can also be achieved if the stator core is configured by laminating N types of core blocks in which circumferential positions of the linking portions are different, where N is an integer that is greater than or equal to 4. In that case, the N types of core blocks should be laminated and integrated such that the circumferential positions of the linking portions are offset at block boundary surfaces by an angular difference of θs/(N−1) degrees at a uniform pitch in a circumferential direction in a plane that is perpendicular to the central axis of the rotating shaft using a point on a central axis of a rotating shaft as an origin. Components of a plurality of different orders of torque pulsation and cogging torque can thereby be reduced, enabling vibration and noise to be further reduced in the rotary electric machine. In addition, by making the number of block boundary surfaces the minimum N−1 positions, magnetic leakage flux can be reduced, enabling decreases in torque to be suppressed in the rotary electric machine.

Moreover, the components of a plurality of different orders of torque pulsation and cogging torque can also be reduced if N types of core blocks are laminated and integrated such that circumferential positions of linking portions are offset with nonuniform spacing in a circumferential direction, enabling vibration and noise to be reduced in the rotary electric machine.

Embodiment 3

Figure 10:
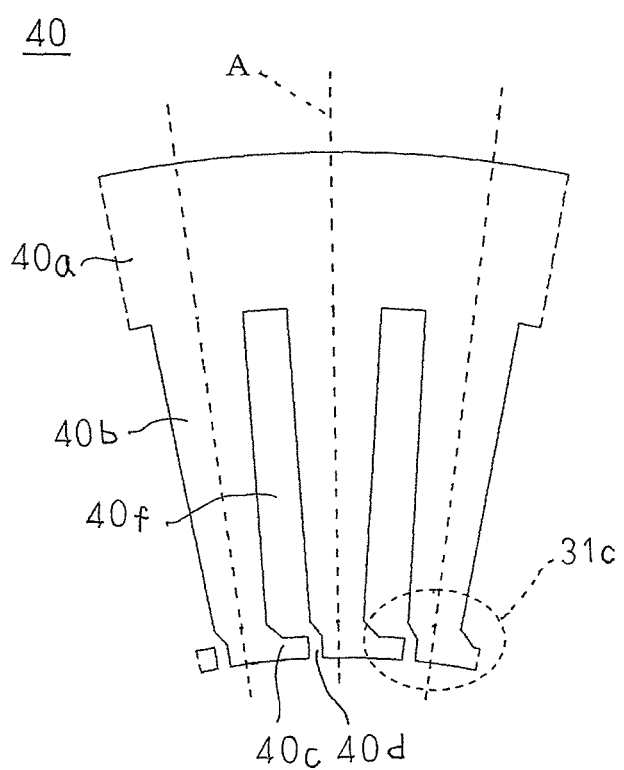
FIG. 10 is a plan that shows a first open core sheet that constitutes part of a stator core in a rotary electric machine according to Embodiment 3 of the present invention.
Figure 11:
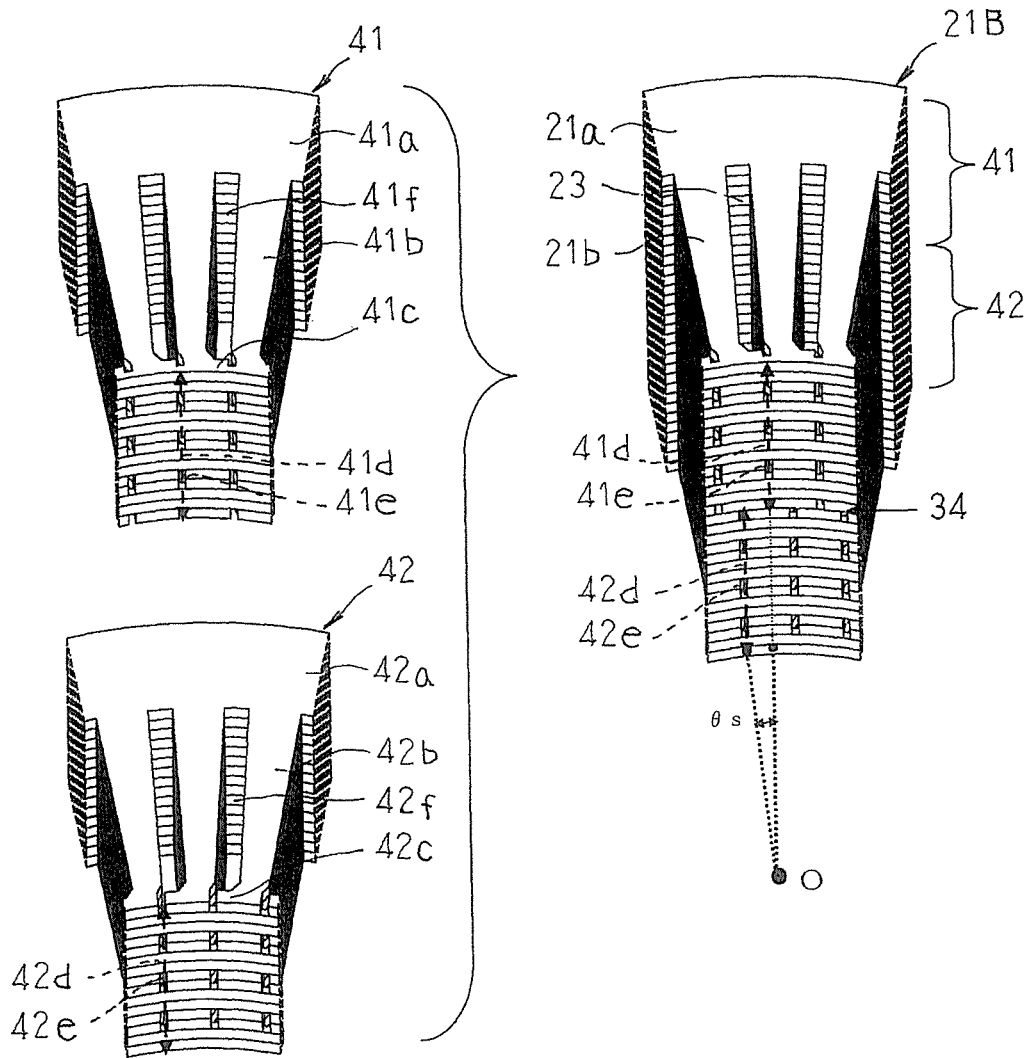
FIG. 11 is a diagram that explains a construction of the stator core in the rotary electric machine according to Embodiment 3 of the present invention.

FIG. 10 is a plan that shows a first open core sheet that constitutes part of a stator core in a rotary electric machine according to Embodiment 3 of the present invention, and FIG. 11 is a diagram that explains a construction of the stator core in the rotary electric machine according to Embodiment 3 of the present invention. Moreover, FIG. 10 shows a model portion representing one sixteenth in a circumferential direction.

In FIG. 10, a first open core sheet 40 is produced by punching a sheet of electromagnetic steel plate, for example, and has: an annular core back portion 40a; tapered tooth portions 40b that are arranged at a pitch angle of θt in a circumferential direction such that each protrudes radially inward from an inner circumferential surface of the core back portion 40a; flange portions 40c that protrude in a first circumferential direction from tips of the tooth portions 40b; opening portions 40d that separate the flange portions 40c and the tips of the tooth portions 40b that are positioned in the first circumferential direction; and slot portions 40f that are formed between adjacent tooth portions 40b. The shapes of the respective tooth tip portions 31c are identical, and have a mirror-asymmetrical shape relative to the tooth central axis A. Moreover, the first open core sheet 40 is configured in a similar or identical manner to the first linked core sheets 30 except that the opening portions 40d are formed instead of the linking portions 30d.

A stator core 21B according to Embodiment 3 is produced by laminating and integrating a first core block 41 and a second core block 42, as shown in FIG. 11.

The first core block 41 is produced by alternately laminating eight first linked core sheets 30 and six first open core sheets 40 two at a time, lastly laminating one first open core sheet 40, and integrating them by crimping or gluing, etc. The core back portions 30a and 40a are laminated and integrated to form a core back 41a, the tooth portions 30b and 40b are laminated and integrated to form teeth 41b, the flange portions 30c and 40c are laminated and integrated to form flanges 41c, the linking portions 30d and the opening portions 40d are laminated and integrated to form linking portions 41d and opening portions 41e, and the slot portions 30f and 40f are laminated to form slot portions 41f.

The second core block 42 is produced by similarly laminating eight first linked core sheets 30 and seven first open core sheets 40 such that front and back surfaces are reversed compared to the first linked core sheets 30 and first open core sheets in the first core block 41, and integrating them by crimping or gluing, etc. The core back portions 30a and 40a are laminated and integrated to form a core back 42a, the tooth portions 30b and 40b are laminated and integrated to form teeth 42b, the flange portions 30c and 40c are laminated and integrated to form flanges 42c, the linking portions 30d and the opening portions 40d are laminated and integrated to form linking portions 42*d* and opening portions 42*e*, and the slot portions 30*f* and 40*f* are laminated to form slot portions 42*f*.

Then the stator core 21B is produced by laminating the first core block 41 and the second core block 42, and integrating them by crimping or gluing, etc., at a block boundary surface 34. The core backs 41*a* and 42*a* are laminated and integrated to form a core back 21*a*, the teeth 41*b* and 42*b* are laminated and integrated to form teeth 21*b*, and the slot portions 41*f* and 42*f* are laminated to form slots 23.

In the stator core 21B that is configured in this manner, positions of the linking portions 41*d* and the opening portions 41*e* of the first core block 41 and the linking portions 42*d* and the opening portions 42*e* of the second core block 42 are offset from each other at the block boundary surface 34 by an angular difference of θs degrees in a circumferential direction in a plane that is perpendicular to the central axis of the rotating shaft 12 using a point on the central axis of the rotating shaft 12 as an origin.

Moreover, Embodiment 3 is configured in a similar or identical manner to Embodiment 1 above except that the stator core 21B is used instead of the stator core 21.

In the first core block 41 and the second core block 42 that constitute the stator core 21B, ratios of the number of laminated first open core sheets 40 relative to the total number of laminated core sheets is equal, being $7/15 \approx 0.47$. Furthermore, first open core sheets 40 are disposed at the block boundary surface 34.

Because two first linked core sheets 30 are disposed on each of two ends of the stator core 21B in the axial direction of the rotating shaft 21, strength on a radially inner side of the stator core 21B can be increased. Furthermore, because the first linked core sheets 30 clamp the first open core sheets 40 from two sides in the axial direction of the rotating shaft 21, decreases in rigidity due to using the first open core sheets 40, which have the opening portions 40*d*, can be suppressed, and overall rigidity of the stator core 21B can be improved. Vibration and noise can thereby be suppressed in the rotary electric machine.

In Embodiment 3, because the circumferential positions of the linking portions 41*d* and 42*d* are offset by an angular difference of θs, the phases of the torque pulsation that arises due to the linking portions 41*d* and 42*d* each have a phase difference from each other. Consequently, among torque pulsation that arises in the rotor 10, the torque pulsation in the portions that face the first and second core blocks 41 and 42 across the magnetic air gap 9 is also mutually canceled out in Embodiment 3 in a similar or identical manner to Embodiment 1 above, reducing torque pulsation.

Because the stator core 21B has first open core sheets 40 that have opening portions 40*d* between adjacent tooth tip portions 31*b*, the ratio of linking portions 41*d* and 42*d* between the tooth tip portions can be reduced in the stator core 21B. Now, the linking portions 41*d* and 42*d* between the tooth tip portions in the stator core 21B form pathways for magnetic leakage flux that arises between the adjacent tooth tip portions. In Embodiment 3, because the ratio of linking portions 41*d* and 42*d* can be reduced, magnetic leakage flux is reduced, enabling the torque to be improved in the rotary electric machine. Because the ratio of linking portions 41*d* and 42*d* between the tooth tip portions in the stator core 21B, which cause torque pulsation, can be reduced, torque pulsation is reduced, enabling vibration and noise to be reduced in the rotary electric machine.

When a rotary electric machine that uses a stator core that has opening portions between adjacent tooth tip portions is driven, the magnetic field in the magnetic air gap portion 9 is distorted in the vicinity of the opening portions, and irregularities may arise in the torque in the rotary electric machine particularly because this distortion of the magnetic field changes depending on the position of the rotor 10 and the phase of the electric current that is passed to the stator winding 22, increasing torque pulsation. Now, torque pulsation due to linking portions and torque pulsation due to opening portions are approximately identical in phase if the circumferential positions of the opening portions and the linking portions are identical. In Embodiment 3, because the circumferential positions of the opening portions 41*e* and 42*e* are offset by an angular difference of θs degrees, the phases of the torque pulsation that arises due to the linking portions opening portions 41*e* and 42*e* each have a phase difference from each other in a similar or identical manner to the phases of the torque pulsation that arises due to the linking portions 41*d* and 42*d*. Consequently, among torque pulsation that arises in the rotor 10, the torque pulsation in the portions that face the first and second core blocks 41 and 42 across the magnetic air gap 9 is canceled out, further reducing torque pulsation. Vibration and noise are thereby further reduced in the rotary electric machine. Because the linking portions 41*d* and 42*d* and the opening portions 41*e* and 42*e* also have an angular difference of θs degrees, torque pulsation that arises due to the linking portions 41*d* and 42*d* and torque pulsation that arises due to the opening portions 41*e* and 42*e* are also mutually canceled out, reducing torque pulsation even further.

In Embodiment 3, the stator core 21B is configured by laminating the first and second core blocks 41 and 42. The circumferential positions of the linking portions 41*d* and 42*d* and the opening portions 41*e* and 42*e* are identical in each of the first and second core blocks 41 and 42, and are offset in a circumferential direction by an angular difference of θs between the first and second core blocks 41 and 42. Torque pulsation due to the linking portions 41*d* and 42*d* and the opening portions 41*e* and 42*e* is thereby reduced.

Because the ratios of the number of laminated first open core sheets 40 relative to the total number of laminated core sheets are equal in the first and second core blocks 41 and 42, magnetic imbalances between the first and second core blocks 41 and 42 in the axial direction of the rotating shaft 21 are resolved. Vibration that arises in the rotary electric machine in the axial direction of the rotating shaft 21 is thereby suppressed. Since the magnitudes of the torque pulsation that arises due to the linking portions 41*d* and 42*d* and the opening portions 41*e* and 42*e* in each of the first and second core blocks 41 and 42 become close, effects that cancel out torque pulsation when the torque waveforms are out of phase are improved. Vibration and noise are thereby further reduced in the rotary electric machine.

Moreover, in Embodiment 3 above, two types of core blocks in which circumferential positions of linking portions and opening portions are different are used, but similar or identical effects can also be achieved if N types of core blocks are used, where N is an integer that is greater than or equal to 3. Here, the N types of core blocks are laminated in an axial direction of a rotating shaft and integrated such that the positions of the linking portions of teeth of each of the core blocks of the stator core are offset by an angular difference of θs/(N−1) degrees from each other in a circumferential direction in a plane that is perpendicular to the central axis of the rotating shaft using a point on a central axis of a rotating shaft as an origin. In that case, by making the block boundary surfaces the minimum N−1 positions, magnetic leakage flux can be reduced, enabling decreases in torque to be suppressed in the rotary electric machine.

In Embodiment 3 above, one type of first linked core sheet and one type of first open core sheet were used, but similar or identical effects can also be achieved if two or more types of first linked core sheets and two or more types of first open core sheets are used.

In Embodiment 3 above, one of each of two types of core blocks that have linking portions at different circumferential positions are used to minimize the block boundary surface in the stator core to a single position, but similar or identical effects can also be achieved if the two types of core blocks that have linking portions at different circumferential positions are increased in number, and the two types of core blocks are laminated alternately to make two or more block boundary surfaces in the stator core.

In Embodiment 3 above, first and second core blocks are each configured by laminating eight first linked core sheets and seven first open core sheets, but the numbers of laminated first linked core sheets and first open core sheets are not limited thereto.

In Embodiment 1 above, the numbers of laminated core sheets in the first and second core blocks are identical, but similar or identical effects can also be achieved if the numbers of laminated core sheets in the first and second core blocks are different.

Embodiment 4

Figure 12:
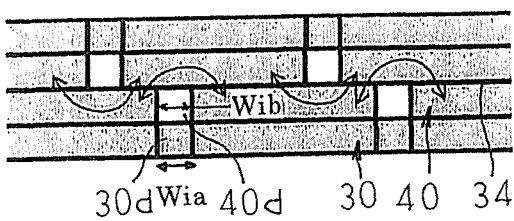
FIG. 12 is a partial plan of a vicinity of block boundary surfaces of stator cores viewed from a side near a magnetic air gap portion in a rotary electric machine according to Embodiment 4 of the present invention.
Figure 12:
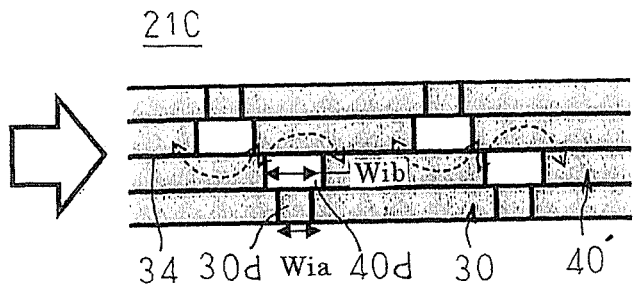

FIG. 12 is a partial plan of a vicinity of block boundary surfaces of stator cores viewed from a side near a magnetic air gap portion in a rotary electric machine according to Embodiment 4 of the present invention, FIG. 12(a) showing a stator core according to Embodiment 3, and FIG. 12(b) showing a stator core according to Embodiment 4.

As shown in FIG. 12(a), in the stator core 21B according to Embodiment 3 above, a circumferential width Wia of the linking portions 30d of the first linked core sheets 30 and a circumferential width Wib of the opening portions 40d of the first open core sheets 40 are equal. As shown in FIG. 12(b), in the stator core 21C according to Embodiment 4, a circumferential width Wib of opening portions 40d of first open core sheets 40' is wider than a circumferential width Wia of linking portions 30d of first linked core sheets 30.

Moreover, Embodiment 4 is configured in a similar or identical manner to Embodiment 3 above except that the stator core 21C is used instead of the stator core 21B.

In the stator core 21B according to Embodiment 3 above, because the circumferential width Wia of the linking portions 30d and the circumferential width Wib of the opening portions 40d are equal, the spacing between the opening portions 40d is wider at the block boundary surface 34 at which the first open core sheets 40 face each other. As a result thereof, magnetic leakage flux that crosses in an axial direction of the rotating shaft 12 between the opening portions 40d is increased, as indicated by the arrows in FIG. 12(a).

In the stator core 21C according to Embodiment 4, because the circumferential width Wia of the linking portions 30d is wider than the circumferential width Wib of the opening portions 40d, the spacing between the opening portions 40d is narrower at the block boundary surface 34 at which the first open core sheets 40' face each other. As a result thereof, magnetic leakage flux that crosses in an axial direction of the rotating shaft 12 between the opening portions 40d is reduced, as indicated by the arrows in FIG. 12(b). Consequently, by using the rotor core 21C instead of the rotor core 21B, torque can be improved in the rotary electric machine, and effects that cancel out torque pulsation can also be improved.

Moreover, in Embodiment 4 above, core sheets in which circumferential widths of the opening portions are wider in all of the first open core sheets are used, but first open core sheets in which circumferential widths of the opening portions are equal to opening widths of the linking portions may be laminated in regions other than the block boundary surface, and first open core sheets in which the circumferential width of the opening portions is wider disposed only at block boundary surface positions. In that case, opening portions that have a broader circumferential width are reduced in the stator core as a whole, enabling increases in torque pulsation and cogging torque to be suppressed.

Embodiment 5

Figure 13:
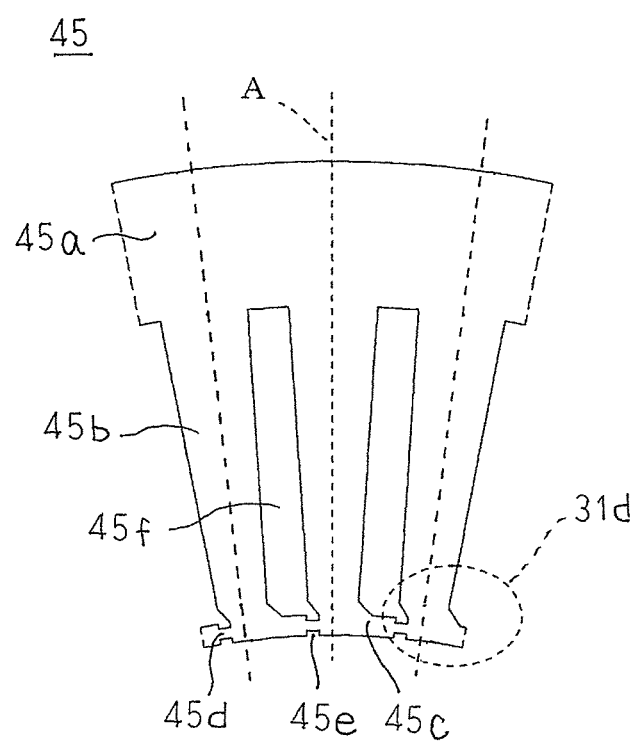
FIG. 13 is a plan that shows a third linked core sheet that constitutes part of a stator core in a rotary electric machine according to Embodiment 5 of the present invention.
Figure 14:
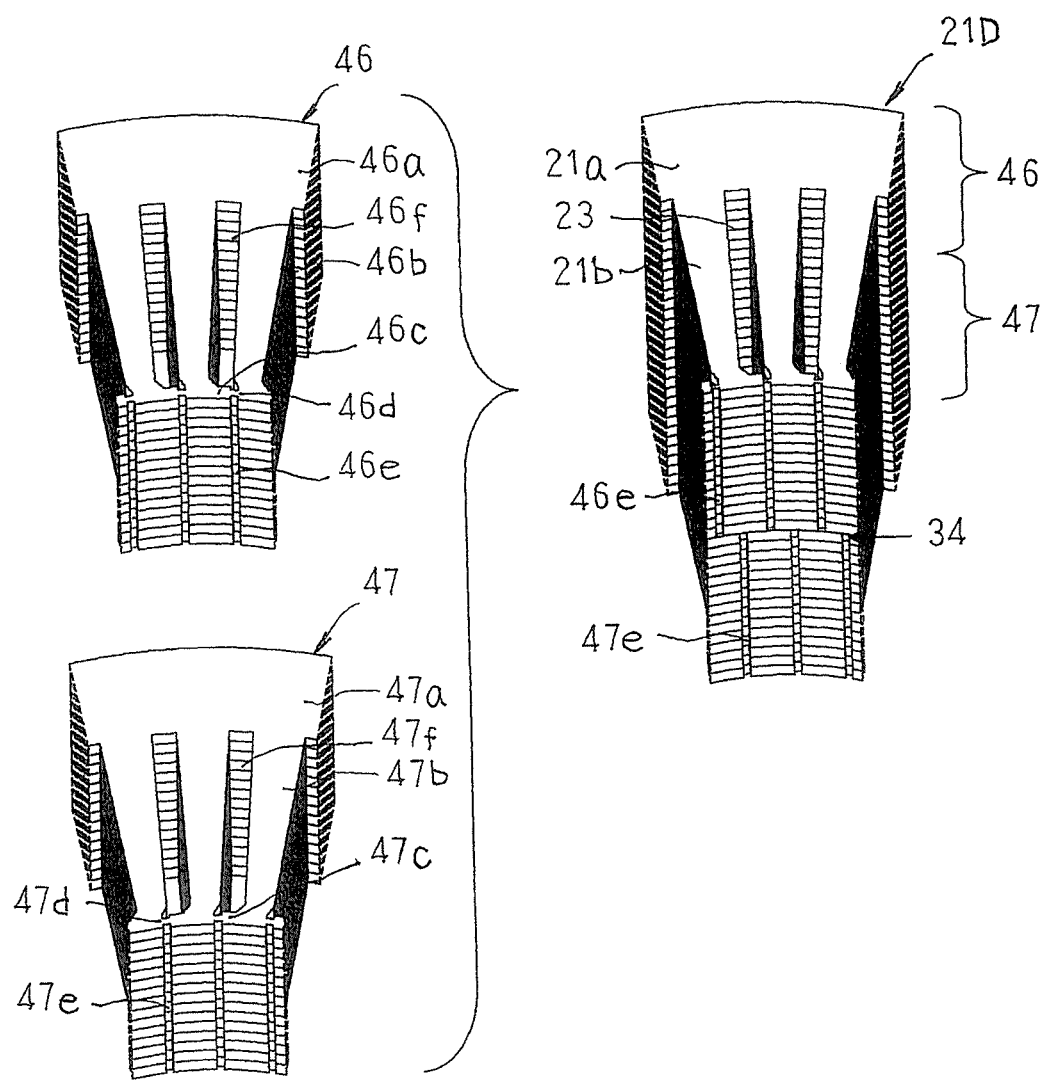
FIG. 14 is a diagram that explains a construction of the stator core in the rotary electric machine according to Embodiment 5 of the present invention.

FIG. 13 is a plan that shows a third linked core sheet that constitutes part of a stator core in a rotary electric machine according to Embodiment 5 of the present invention, and FIG. 14 is a diagram that explains a construction of the stator core in the rotary electric machine according to Embodiment 5 of the present invention. Moreover, FIG. 13 shows a model portion representing one sixteenth in a circumferential direction.

In FIG. 13, a third linked core sheet 45 is produced by punching a sheet of electromagnetic steel plate, for example, and has: an annular core back portion 45a; tapered tooth portions 45b that are arranged at a pitch angle of θt in a circumferential direction such that each protrudes radially inward from an inner circumferential surface of the core back portion 45a; flange portions 45c that protrude in a first circumferential direction from tips of the tooth portions 45b; linking portions 45d that link the flange portions 45c and the tips of the tooth portions 45b that are positioned in the first circumferential direction; indented portions 45e in which inner circumferential wall surfaces of the linking portions 45d are indented radially outward; and slot portions 45f that are formed between adjacent tooth portions 45b. The shapes of the respective tooth tip portions 31d are identical, and have a mirror-asymmetrical shape relative to the tooth central axis A. Moreover, the third linked core sheet 45 is formed in a similar or identical manner to the first linked core sheets 30 in Embodiment 1 except for having indented portions 45e.

A stator core 21D includes a first core block 46 and a second core block 47, as shown in FIG. 14.

The first core block 46 is produced by laminating fifteen first linked core sheets 45 so as to be oriented in an identical direction, and integrating them by crimping or gluing, etc. The core back portions 45a are laminated and integrated to form a core back 46a, the tooth portions 45b are laminated and integrated to form teeth 46b, the flange portions 45c are laminated and integrated to form flanges 46c, the linking portions 45d are laminated and integrated to form linking portions 46d, the indented portions 45e are laminated and integrated to form indented portions 46e, and the slot portions 45f are laminated to form slot portions 46f.

The second core block 47 is produced by laminating fifteen first linked core sheets 45 so as to be oriented in an identical direction such that front and back surfaces are reversed compared to the first linked core sheets 45 in the first core block 46, and integrating them by crimping or gluing, etc. The core back portions 45a are laminated and integrated to form a core back 47a, the tooth portions 45b are laminated and integrated to form teeth 47b, the flange portions 45c are laminated and integrated to form flanges 47c, the linking portions 45d are laminated and integrated to form linking portions 47d, the indented portions 45e are laminated and integrated to form indented portions 47e, and the slot portions 45f are laminated to form slot portions 47f.

Then the stator core 21D is produced by laminating the first core block 46 and the second core block 47, and integrating them by crimping or gluing, etc., at a block boundary surface 34. The core backs 46a and 47a are laminated and integrated to form a core back 21a, the teeth 46b and 47b are laminated and integrated to form teeth 21b, and the slot portions 46f and 47f are laminated to form slots 23.

In the stator core 21D that is configured in this manner, positions of the linking portions 46d of the first core block 46 and the linking portions 47d of the second core block 47 are offset at the block boundary surface 34 in a circumferential direction in a plane that is perpendicular to the central axis of the rotating shaft 12 using a point on the central axis of the rotating shaft 12 as an origin.

Consequently, in Embodiment 5, torque pulsation due to the linking portions 46d and 47d is also reduced in a similar or identical manner to Embodiment 1 above, reducing vibration and noise in the rotary electric machine.

In Embodiment 5, indented portions 46e and 47e are formed on a radially inner side of linking portions 46d and 47d. Thus, because the linking portions 46d and 47d are positioned further away from the magnetic air gap portion 9 in a radially outward direction of the stator core 21D, magnetic saturation of the linking portions 46d and 47d is alleviated, and torque pulsation is also reduced.

By changing depth of the indented portions 46e and 47e, radial positions of the linking portions 46d and 47d can be changed. Then, by changing the radial positions of the linking portions 46d and 47d, rigidity of the stator core 21D can be changed, enabling the natural frequency of the rotary electric machine to be changed. Thus, according to Embodiment 5, resonance and natural frequency of the rotary electric machine can be offset, enabling vibration and noise to be further reduced in the rotary electric machine.

Moreover, in Embodiment 5 above, first and second core blocks are produced by laminating and integrating only third linked core sheets 45, but similar or identical effects can also be achieved if first and second core blocks are produced by laminating and integrating first linked core sheets and third linked core sheets.

Embodiment 6

Figure 15:
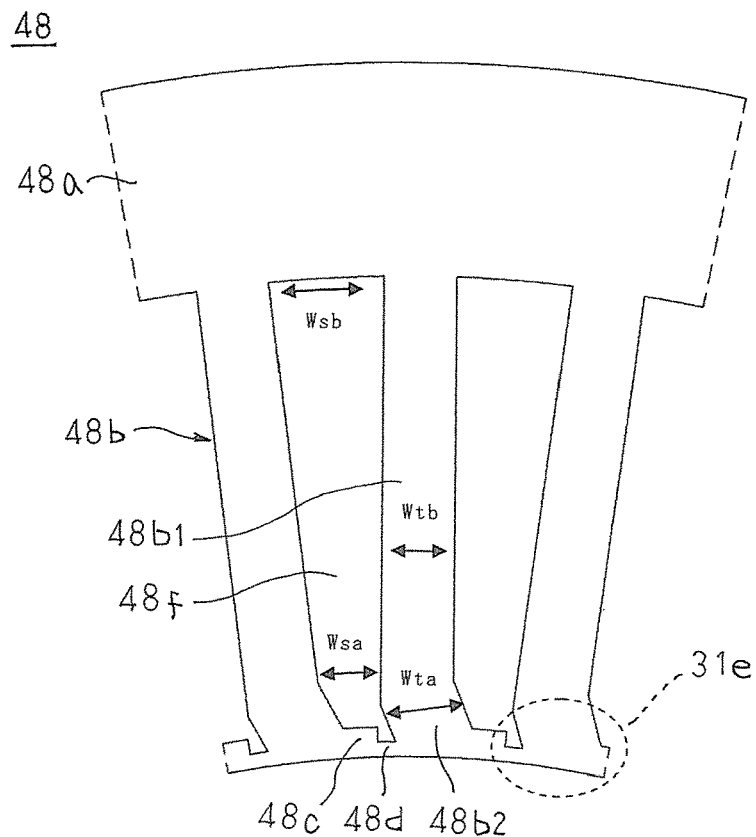
FIG. 15 is a plan that shows a third linked core sheet that constitutes part of a stator core in a rotary electric machine according to Embodiment 6 of the present invention.

FIG. 15 is a plan that shows a third linked core sheet that constitutes part of a stator core in a rotary electric machine according to Embodiment 6 of the present invention. Moreover, FIG. 15 shows a model portion representing one sixteenth in a circumferential direction.

In FIG. 15, a fourth linked core sheet 48 is produced by punching a sheet of electromagnetic steel plate, for example, and has: an annular core back portion 48a; tapered tooth portions 48b that are arranged at a pitch angle of θt in a circumferential direction such that each protrudes radially inward from an inner circumferential surface of the core back portion 48a; flange portions 48c that protrude in a first circumferential direction from tips of the tooth portions 48b; linking portions 48d that link the flange portions 48c and the tips of the tooth portions 48b that are positioned in the first circumferential direction; and slot portions 48f that are formed between adjacent tooth portions 48b. The shapes of the respective tooth tip portions 31e are identical, and have a mirror-asymmetrical shape relative to the tooth central axis A.

The tooth portions 48b have: a base portion 48b1 that protrudes radially inward from a core back portion 48a; and a tip portion 48b2 that is formed on a protruding end of the base portion 48b1. The base portion 48b1 is formed so as to have a flat rectangular shape that has a circumferential width Wtb. The circumferential width Wtb is set so as to achieve a minimum magnetic path cross-sectional area that is required of the teeth. In other words, the circumferential width Wtb is a minimum circumferential width for the teeth. A minimum circumferential width Wta of the tip portion 48b2 is wider than the circumferential width Wtb of the base portion 48b1.

In Embodiment 6, first and second core blocks are produced by laminating fourth linked core sheets 48. The fourth linked core sheets 48 are formed in a similar or identical manner to the first linked core sheets 30 in Embodiment 1 except for the shape of the tooth portions 48b.

Consequently, vibration and noise are also reduced in the rotary electric machine in Embodiment 6, in a similar or identical manner to Embodiment 1 above.

In Embodiment 6, because the minimum circumferential width Wta of the tip portions 48b2 of the tooth portions 48b is wider than the circumferential width Wtb of the base portions 48b1, magnetic saturation is alleviated in the tip portions 48b2. Increased torque can thereby be achieved in the rotary electric machine, and increases in torque pulsation due to magnetic saturation of the tip portions 48b2 can also be suppressed.

Because the base portions 48b1 of the tooth portions 48b are formed so as to have a flat rectangular shape that has a minimum circumferential width Wtb, the slot portions 48f have a trapezoidal cross-sectional shape in which a radially outer circumferential width Wsb is wider than a radially inner circumferential width Wsa. Consequently, slot area can be increased while ensuring the minimum tooth width Wtb. Because the cross-sectional area of the stator winding that can be inserted into the slots can thereby be increased, enabling reductions in stator winding resistance to be achieved, the amount of heat generated in the rotary electric machine can be reduced, and output from the rotary electric machine can be improved.

Because the slot portions 48e are formed so as to have trapezoidal cross-sectional shapes, the cross-sectional shape of the portion of the stator winding that is inserted into the slots can be shaped so as to enable ejection of the stator winding to be suppressed.

Embodiment 7

Figure 16:
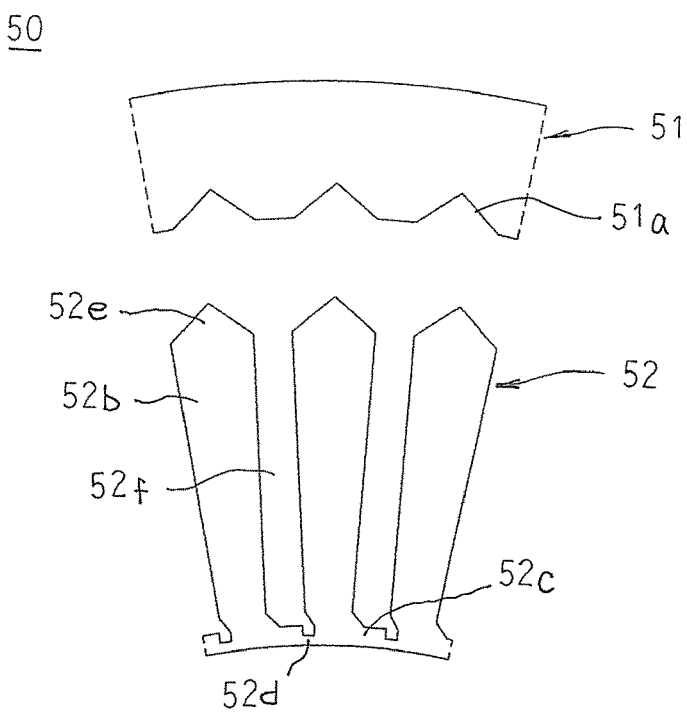
FIG. 16 is a plan that shows a linked core sheet that constitutes part of a stator core in a rotary electric machine according to Embodiment 7 of the present invention.

FIG. 15 is a plan that shows a linked core sheet that constitutes part of a stator core in a rotary electric machine according to Embodiment 7 of the present invention, and FIG. 16 is a diagram that explains a construction of the stator core in the rotary electric machine according to Embodiment 7 of the present invention. Moreover, FIG. 16 shows a model portion representing one sixteenth in a circumferential direction.

In FIG. 16, a linked core sheet 50 has a radially outer core sheet 51 and a radially inner core sheet 52, each being produced by punching a sheet of electromagnetic steel plate. The radially outer core sheet 51 is formed so as to have an annular shape, and notches 51a are formed at a pitch angle of θt circumferentially around an inner circumferential wall surface thereof. The radially inner core sheet 52 has: tooth portions 52b that are arranged at a pitch angle of θt circumferentially such that each extends radially; flange portions 52c that protrude in a first circumferential direction from radially inner end portions of the tooth portions 52b; linking portions 52d that link flange portions 52c and radially inner end portions of the tooth portions 52b that are positioned in the first circumferential direction; projections 52e that are formed on radially outer end portions of the tooth portions 52b so as to be able to fit together with the notches 51a; and slot portions 52f that are formed between adjacent tooth portions 52b. Shapes of the respective tooth tip portions are identical, and have a mirror-asymmetrical shape relative to the tooth central axis A (not shown).

Figure 17:
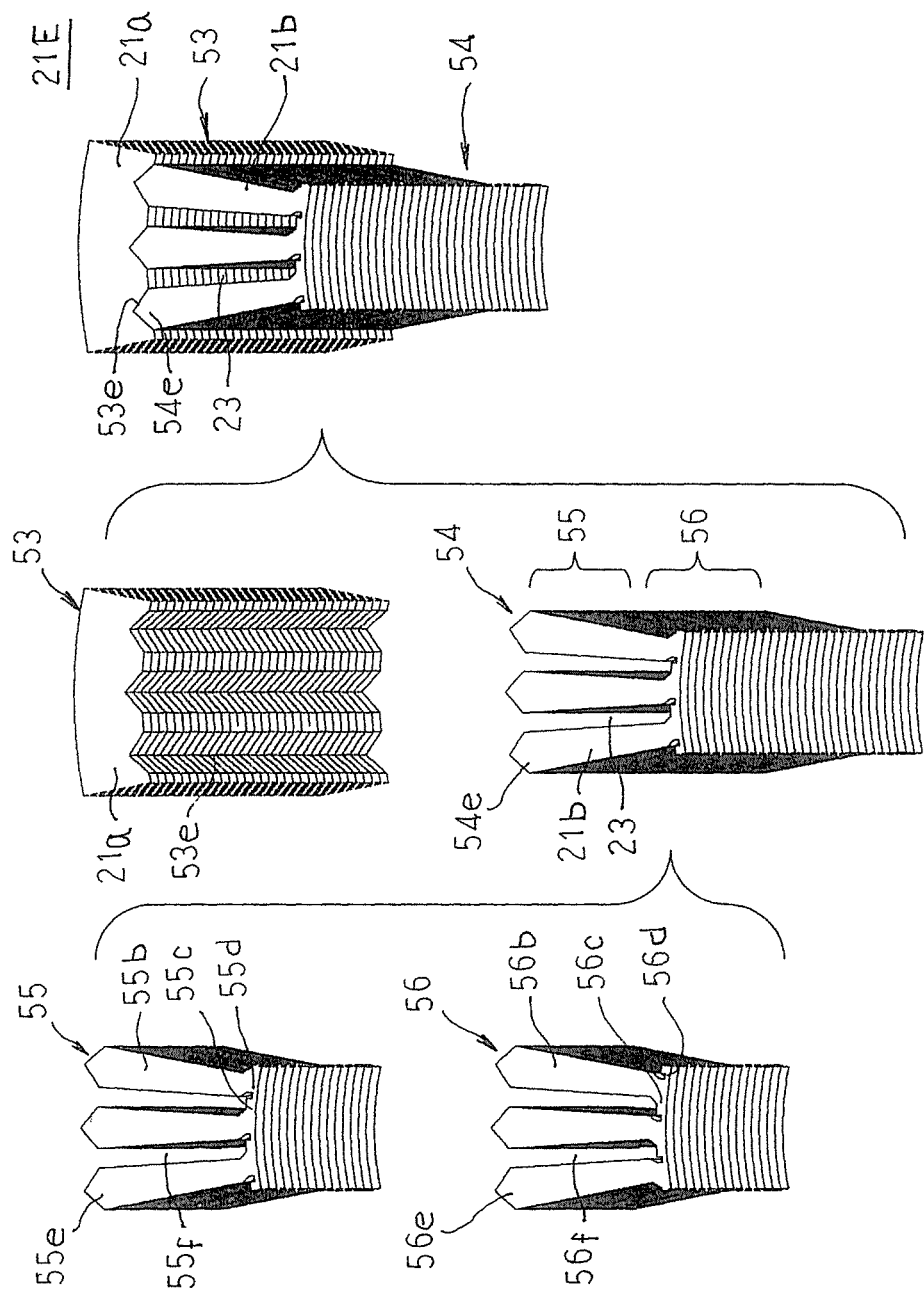
FIG. 17 is a diagram that explains a construction of the stator core in the rotary electric machine according to Embodiment 7 of the present invention.

Next, construction of the stator core 21E according to Embodiment 7 will be explained with reference to FIG. 17.

A first radially inner core block 55 is produced by laminating fifteen radially inner core sheets 52 so as to be oriented in an identical direction, and integrating them by crimping or gluing, etc. The tooth portions 52b are laminated and integrated to form teeth 55b, the flange portions 52c are laminated and integrated to form flanges 55c, the linking portions 52d are laminated and integrated to form linking portions 55d, the projections 52e are laminated and integrated to form projecting portions 55e, and the slot portions 52f are laminated to form slot portions 55f.

A second radially inner core block 56 is produced by laminating fifteen radially inner core sheets 52 so as to be oriented in an identical direction such that front and back surfaces are reversed compared to the radially inner core sheets 52 in the first radially inner core block 55, and integrating them by crimping or gluing, etc. The tooth portions 52b are laminated and integrated to form teeth 56b, the flange portions 52c are laminated and integrated to form flanges 56c, the linking portions 52d are laminated and integrated to form linking portions 56d, the projections 52e are laminated and integrated to form projecting portions 56e, and the slot portions 52f are laminated to form slot portions 56f.

Then a radially inner core block 54 is produced by laminating the first radially inner core block 55 and the second radially inner core block 56, and integrating them by crimping or gluing, etc., at a block boundary surface 34. The teeth 55b and 56b are laminated and integrated to form teeth 21b, the projecting portions 55e and 56e are laminated and integrated to form interfitting protrusions 54e, and the slot portions 55f and 56f are laminated to form slots 23.

A radially outer core block 53 is produced by laminating thirty radially outer core sheets 51, and integrating them by crimping or gluing, etc. The radially outer core sheets 51 are laminated and integrated to form a core back 21a, and the notches 51a are laminated and integrated to form interfitting recess portions 53a. The stator core 21E is produced by integrating the radially outer core block 53 and the radially inner core block 54 by press-fitting the interfitting protrusions 54e into the interfitting recess portions 53a from an axial direction of the rotating shaft 21.

In the stator core 21E that is configured in this manner, positions of the linking portions 55d of the first radially inner core block 55 and the linking portions 56d of the second radially inner core block 56 are offset at the block boundary surface 34 in a circumferential direction in a plane that is perpendicular to the central axis of the rotating shaft 12 using a point on the central axis of the rotating shaft 12 as an origin.

Consequently, similar or identical effects to those in Embodiment 1 above can also be achieved in Embodiment 7.

In Embodiment 7, the stator core 21E is divided into two portions, i.e., the annular radially outer core block 53, and the radially inner core block 54, which has the teeth 21b. Because the stator winding 22 can be mounted to the radially inner core block 54 before integrating the radially inner core block 54 into the radially outer core block 53, the winding operation is facilitated, enabling manufacturability of the rotary electric machine to be improved.

Embodiment 8

Figure 18:
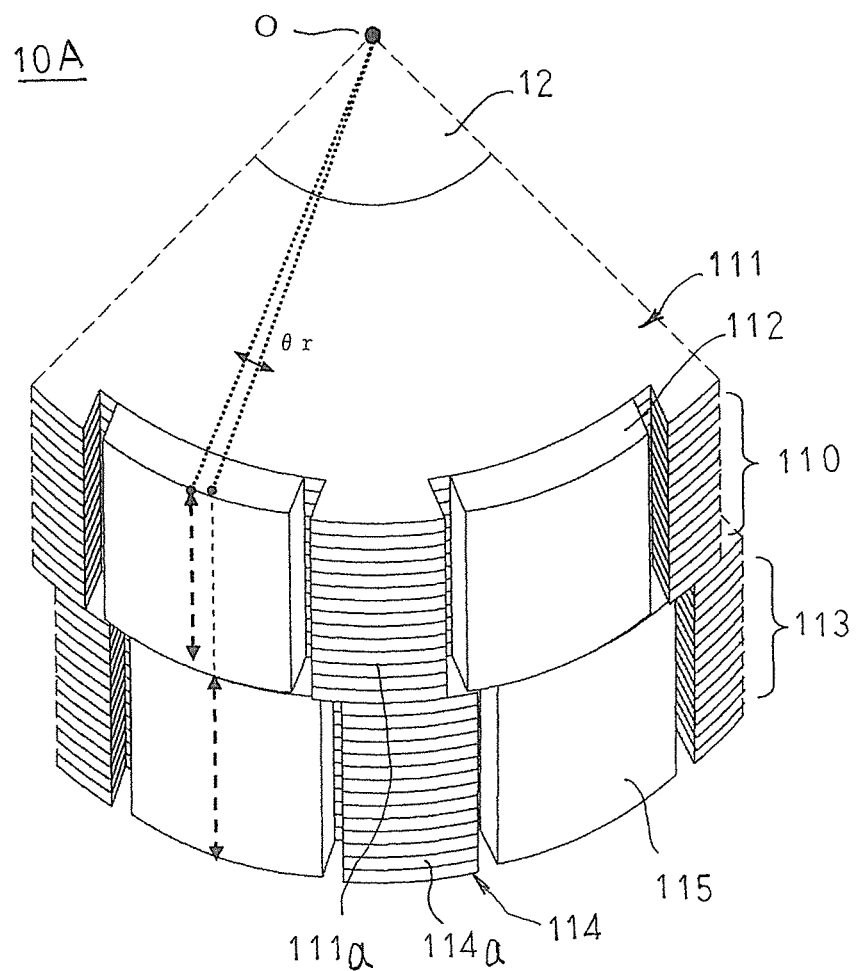
FIG. 18 is a partial oblique projection that shows a configuration of a rotor in a rotary electric machine according to Embodiment 8 of the present invention.
Figure 19:
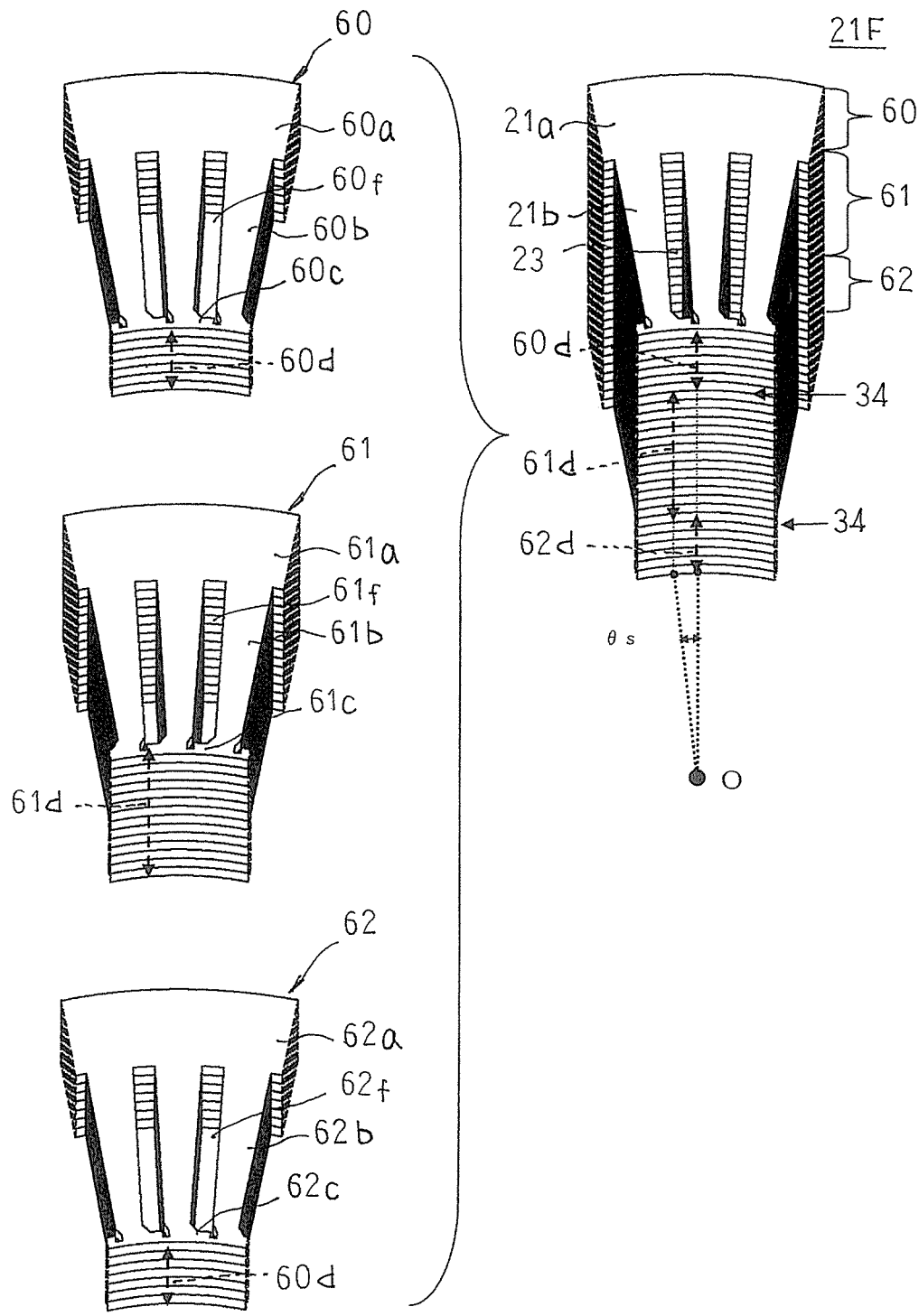
FIG. 19 is a diagram that explains a construction of a stator core in the rotary electric machine according to Embodiment 8 of the present invention.
Figure 20:
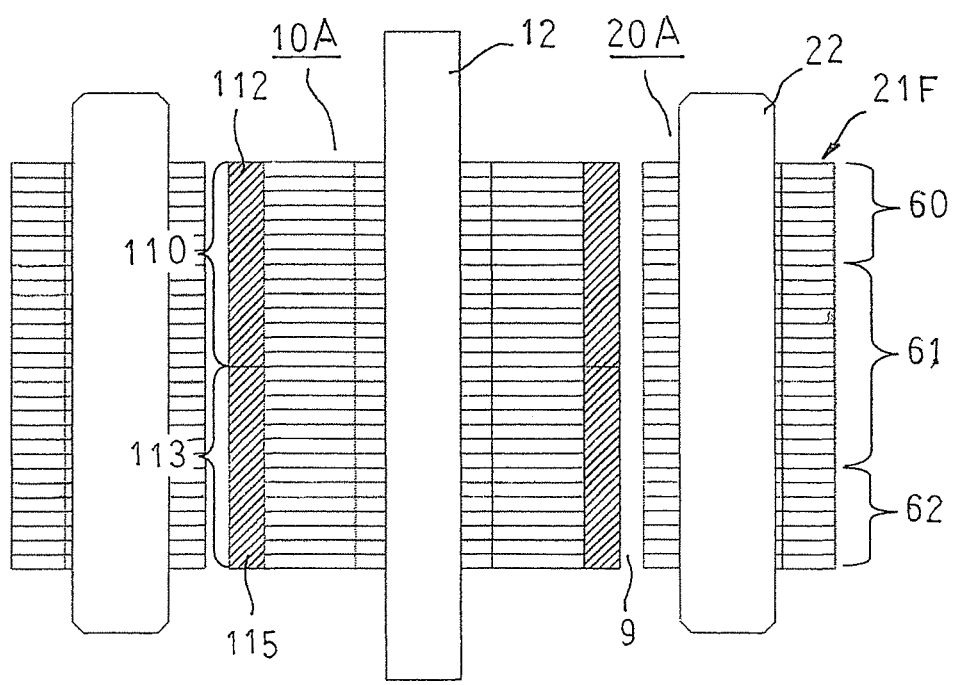
FIG. 20 is a cross section that schematically shows the rotary electric machine according to Embodiment 8 of the present invention.

FIG. 18 is a partial oblique projection that shows a configuration of a rotor in a rotary electric machine according to Embodiment 8 of the present invention, FIG. 19 is a diagram that explains a construction of a stator core in the rotary electric machine according to Embodiment 8 of the present invention, and FIG. 20 is a cross section that schematically shows the rotary electric machine according to Embodiment 8 of the present invention. Moreover, FIG. 18 shows a model portion representing one fourth in a circumferential direction.

In FIG. 18, a rotor 10A is produced by laminating and integrating a first rotor block 110 and a second rotor block 113 in an axial direction of a rotating shaft 12.

The first rotor block 110 includes: a first rotor core 111 that is produced by laminating and integrating fourteen rotor core sheets in an axial direction of a rotating shaft 12; and eight first permanent magnets 112 that are disposed at a uniform angular pitch on an outer circumferential surface of the first rotor core 111. Polarities of adjacent first permanent magnets 112 are magnetized so as to be mutually opposite. Portions of the first rotor core 111 between the first permanent magnets 112 protrude radially outward, and air gap portions are formed between those protruding portions 111a and the first permanent magnets 112.

The second rotor block 113 includes: a second rotor core 114 that is produced by laminating and integrating fourteen rotor core sheets in the axial direction of the rotating shaft 12; and eight second permanent magnets 115 that are disposed at a uniform angular pitch on an outer circumferential surface of the second rotor core 114. Polarities of adjacent second permanent magnets 115 are magnetized so as to be mutually opposite. Portions of the second rotor core 114 between the second permanent magnets 115 protrude radially outward, and air gap portions are formed between those protruding portions 114a and the second permanent magnets 115.

The first rotor block 110 and the second rotor block 113 are configured so as to have substantially identical shapes, are disposed so as to be stacked in the axial direction of the rotating shaft 12 such that circumferential positions of the first and second permanent magnets 112 and 115 are offset by an angular difference of Or, and are integrated. In other words, positions of field poles of the first and second rotor blocks 110 and 113 are offset by an angular difference of Or.

In FIG. 19, a stator core 21F has a first core block 60, a second core block 61, and a third core block 62.

The first core block 60 is produced by laminating seven first linked core sheets 30 so as to be oriented in an identical direction, and integrating them by crimping or gluing, etc. The core back portions 30a are laminated and integrated to form a core back 60a, the tooth portions 30b are laminated and integrated to form teeth 60b, the flange portions 30c are laminated and integrated to form flanges 60c, the linking portions 30d are laminated and integrated to form linking portions 60d, and the slot portions 30f are laminated to form slot portions 60f.

A second core block 61 is produced by laminating fourteen first linked core sheets 30 so as to be oriented in an identical direction such that front and back surfaces are reversed compared to the first linked core sheets 30 in the first core block 60, and integrating them by crimping or gluing, etc. The core back portions 30a are laminated and integrated to form a core back 61a, the tooth portions 30b are laminated and integrated to form teeth 61b, the flange portions 30c are laminated and integrated to form flanges 61c, the linking portions 30d are laminated and integrated to form linking portions 61d, and the slot portions 30f are laminated to form slot portions 61f.

The third core block 62 is produced by laminating seven first linked core sheets 30 so as to be oriented in an identical direction, and integrating them by crimping or gluing, etc. The core back portions 30a are laminated and integrated to form a core back 62a, the tooth portions 30b are laminated and integrated to form teeth 62b, the flange portions 30c are laminated and integrated to form flanges 62c, the linking portions 30d are laminated and integrated to form linking portions 62d, and the slot portions 30f are laminated to form slot portions 62f. Moreover, the third core block 62 has a substantially identical configuration to the first core block 60.

Then the stator core 21F is produced by laminating the first core block 60, the second core block 61, and the third core block 62, and integrating them by crimping or gluing, etc., at block boundary surfaces 34. The core backs 60a, 61a, and 62a are laminated and integrated to form a core back 21a, the teeth 60b, 61b, and 62b are laminated and integrated to form teeth 21b, and the slot portions 60f, 61f, and 62f are laminated to form slots 23.

In the stator core 21F that is configured in this manner, positions of the linking portions 60d and 62d of the first and third core blocks 60 and 62 and the linking portions 61d of the second core block 61 are offset at the block boundary surfaces 34 by an angular difference of θs degrees in a circumferential direction in a plane that is perpendicular to the central axis of the rotating shaft 12 using a point on the central axis of the rotating shaft 12 as an origin.

As shown in FIG. 20, a rotary electric machine 101A according to Embodiment 8 is configured by disposing the rotor 10A coaxially inside a stator 20A so as to have a magnetic air gap portion 9 interposed. The first rotor block 110 faces the first core block 60 and a region that is one half of the second core block 61 in the axial direction of the rotating shaft 21 across the magnetic air gap portion 9. The second rotor block 113 faces a region that is one half of the second core block 61 in the axial direction of the rotating shaft 21 and the second core block 62 across the magnetic air gap portion 9. Here, the number of laminated sheets in the first core block 60, in the regions that are one half of the second core block 61, and in the third core block 62 are equal.

Thus, the first and third core blocks 60 and 62 and the second core block 61 face the first and second rotor blocks 110 and 113 in identical ratios. Thus, because the circumferential positions of the linking portions 60d, 61d, and 62d are arranged so as to be offset from each other in a circumferential direction, torque pulsation that arises in the linking portions 60d, 61d, and 62d can be canceled out, enabling torque pulsation that arises in the rotary electric machine 101A also to be canceled out in Embodiment 8 in a similar or identical manner to Embodiment 1 above.

According to Embodiment 8, because the first and second rotor blocks 110 and 113 are disposed so as to be offset by an angular difference of θr degrees circumferentially, torque pulsation that arises in the linking portions 60d, 61d, and 62d is further canceled between the first and second rotor blocks 110 and 113. Torque pulsation that arises in the rotary electric machine 101A can thereby be further canceled out. Furthermore, by making the angular difference of θr degrees and the angular difference of θs degrees different angles, components of a plurality of orders of torque pulsation and cogging torque can be reduced, enabling vibration and noise that arises in the rotary electric machine 101A to be further reduced. Because the stator core 21F is also a shape that is symmetrical in a plane that is perpendicular to the rotating shaft 12 that passes through the center of the stator core 21F in the axial direction of the rotating shaft 12, imbalances in electromagnetic forces that arise in the axial direction of the rotating shaft 12 of the rotary electric machine 101A are resolved, enabling vibration of the rotary electric machine 101A to be further reduced.

Moreover, in Embodiment 8 above, field poles of a rotor are constituted by permanent magnets and a rotor core, but it goes without saying that similar or identical effects can also be achieved if they are constituted using only a rotor core, or if they are constituted by disposing conductors in the rotor, provided that circumferential positions of the field poles of the rotor are disposed so as to be offset by an angular difference of θr degrees.

In Embodiment 8 above, first and second rotor cores are constituted by laminating sheets of magnetic material, but similar or identical effects can also be achieved if the first and second rotor cores are constituted by solid bodies of magnetic material.

In Embodiment 8 above, the first and second rotor blocks have an identical construction, but similar or identical effects can also be achieved if the first and second rotor blocks have different constructions.

In Embodiment 8 above, first and third core blocks 60 and 62 and a second core block 61 face first and second rotor blocks at identical ratios, but it goes without saying that torque pulsation is also effectively canceled out if first and third core blocks 60 and 62 and a second core block 61 face first and second rotor blocks at different ratios.

In Embodiment 8 above, rotor blocks are configured into two layers, and core blocks are configured into three layers, but the number of layers of rotor blocks and core blocks is not limited thereto. In other words, similar or identical effects can also be achieved if the number of layers of rotor blocks and core blocks are different numbers of layers than in Embodiment 8 above, provided that each of the rotor blocks faces a plurality of core blocks in which circumferential positions of linking portions are different across a magnetic air gap portion.

In Embodiment 8 above, the number of layers of rotor blocks is two layers, but the number of layers of rotor blocks may be three or more layers. In that case, components of a plurality of orders of torque pulsation and cogging torque can be reduced if configured such that circumferential positions of permanent magnets that are mounted to the rotor blocks have a plurality of angular differences of θr degrees between the layers of rotor blocks, enabling vibration and noise that arise in the rotary electric machine to be further reduced.

Embodiment 9

Figure 21:
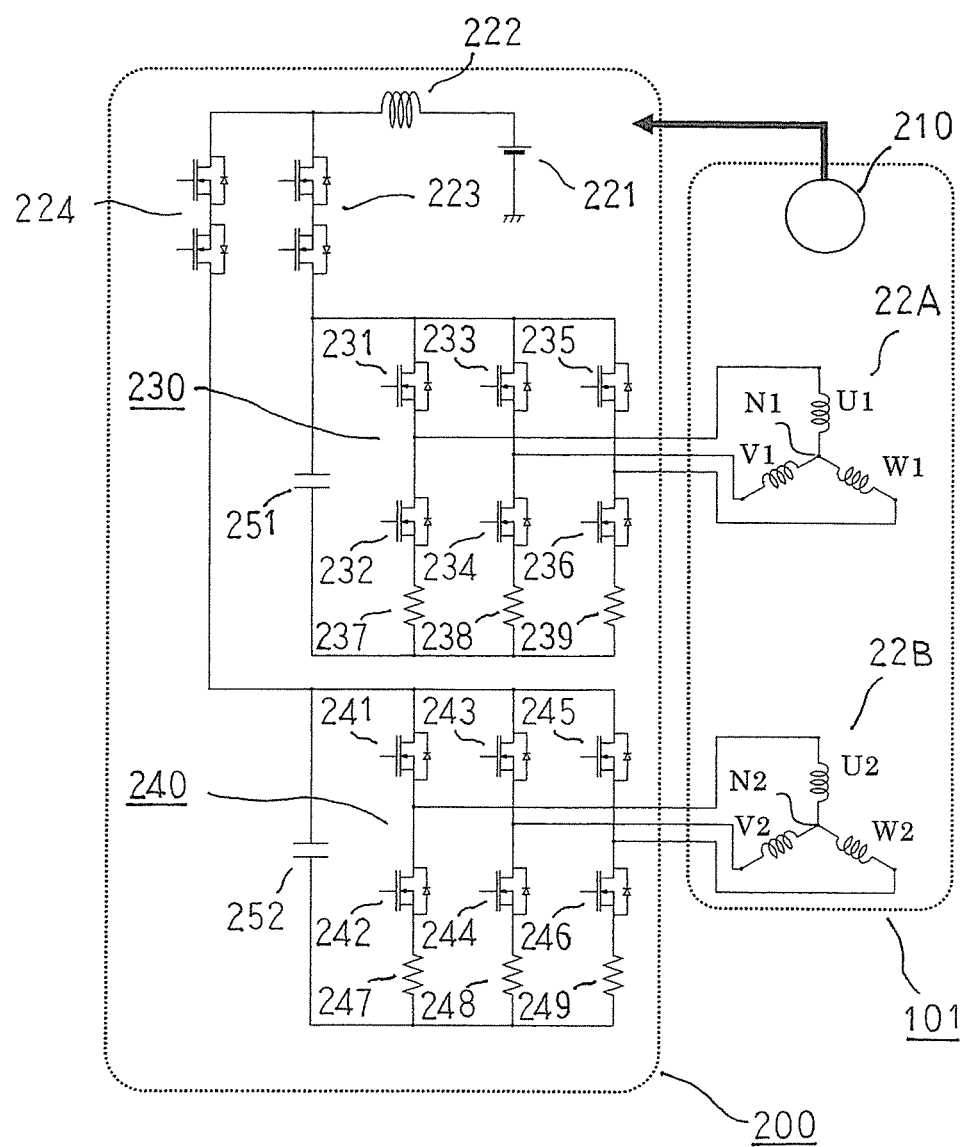
FIG. 21 is a circuit diagram that shows an electric driving apparatus according to Embodiment 9 of the present invention.

FIG. 21 is a circuit diagram that shows an electric driving apparatus according to Embodiment 9 of the present invention. Moreover, in FIG. 21, for simplicity, only a stator winding is depicted for a rotary electric machine, and only an inverter circuit is depicted for an ECU.

In FIG. 21, a stator winding 22 is constituted by: a first three-phase winding 22A that is configured by wye-connecting a first U-phase winding U1, a first V-phase winding V1, and a first W-phase winding W1; and a second three-phase winding 22B that is configured by wye-connecting a second U-phase winding U2, a second V-phase winding V2, and a second W-phase winding W2. Moreover, the first and second three-phase windings 22A and 22B are each constituted by wye-connecting three phases of winding, but may be configured by delta-connecting three phases of winding. Furthermore, N1 and N2 are neutral points of the first and second three-phase windings 22A and 22B.

An ECU 200 includes: a first inverter circuit 230 that supplies electric current to the first three-phase winding 22A; and a second inverter circuit 240 that supplies electric current to the second three-phase winding 22B. Direct-current power is supplied to the first and second inverter circuits 230 and 240 from an electric power supply such as a battery 221, via a noise reduction coil 222 and first and second electric power supply relays 223 and 224. Moreover, in FIG. 21, the battery 221 is depicted as if it were inside the ECU 200, but the battery 221 is actually an external electric power supply, and is supplied to the ECU 200 by means of an electric power supply connector 208, as shown in FIG. 1. The first and second electric power supply relays 223 and 224 are each constituted by two MOSFETs, and open during failure, etc., to prevent excessive electric current from flowing. Here, the battery 221, the coil 222, and the first and second electric power supply relays 223 and 224 are connected in that order, but they may be connected in order of the battery 221, the first and second electric power supply relays 223 and 224, and the coil 222.

The first inverter circuit 230 and the second inverter circuit 240 are configured into bridge circuits using six MOSFETs each. Smoothing capacitors 251 and 252 are connected to the first and second inverter circuits 230 and 240 in parallel. Here, one smoothing capacitor 251 and 252 is connected in parallel to each of the first and second inverter circuits 230 and 240, but a plurality of smoothing capacitors 251 and 252 may be connected in parallel to each of the first and second inverter circuits 230 and 240.

The second inverter circuit 240 is configured by connecting in parallel a MOSFET 241 and a MOSFET 242 that are connected in series, a MOSFET 243 and a MOSFET 244 that are connected in series, and a MOSFET 245 and a MOSFET 246 that are connected in series. Electric current value detecting shunt resistors 247, 248, and 249 are connected on a ground side of each of lower MOSFETs 242, 244, and 246. A smoothing capacitor 252 is connected to the second inverter circuit 240 in parallel. Moreover, the shunt resistors 247, 248, and 249 are connected on a ground side of three MOSFETs 242, 244, and 246, but the shunt resistors may be connected on a ground side of two MOSFETs or one MOSFET.

The direct-current power from the battery 221 is converted to alternating current by the first inverter circuit 230, and is supplied from a connecting portion between the MOSFET 231 and the MOSFET 232 to the first U-phase winding U1 by means of a busbar, from a connecting portion between the MOSFET 233 and the MOSFET 234 to the first V-phase winding V1 by means of a busbar, and from a connecting portion between the MOSFET 235 and the MOSFET 236 to the first W-phase winding W1 by means of a busbar.

The second inverter circuit 240 is configured by connecting in parallel a MOSFET 241 and a MOSFET 242 that are connected in series, a MOSFET 243 and a MOSFET 244 that are connected in series, and a MOSFET 245 and a MOSFET 246 that are connected in series. Electric current value detecting shunt resistors 247, 248, and 249 are connected on a ground side of each of lower MOSFETs 242, 244, and 246. A smoothing capacitor 252 is connected to the first inverter circuit 240 in parallel. Moreover, the shunt resistors 247, 248, and 249 are connected on a ground side of three MOSFETs 242, 244, and 246, but the shunt resistors may be connected on a ground side of two MOSFETs or one MOSFET.

The direct-current power from the battery 221 is converted to alternating current by the second inverter circuit 240, and is supplied from a connecting portion between the MOSFET 241 and the MOSFET 242 to the second U-phase winding U2 by means of a busbar, from a connecting portion between the MOSFET 243 and the MOSFET 244 to the second V-phase winding V2 by means of a busbar, and from a connecting portion between the MOSFET 245 and the MOSFET 246 to the second W-phase winding W2 by means of a busbar.

Moreover, in FIG. 21, an electric power supply relay that shuts off the rotary electric machine 101 and the first and second inverter circuits 230 and 240 electrically during a failure is not depicted, but such an electric power supply relay may be included. In that case, the electric power supply relay may be disposed at the neutral points N1 and N2, or may be disposed between the rotary electric machine 101 and the first and second inverter circuits 230 and 240.

The MOSFETs 231 through 236, and 241 through 246 of the first and second inverter circuits 230 and 240 that are configured in this manner are switched by signals that are sent from a controlling circuit (not shown) in response to the angle of rotation that is detected by a magnetic sensor 210 that functions as a rotational angle sensor that is included in the rotary electric machine 101 to supply a desired three-phase electric current to the first three-phase winding 22A and the second three-phase winding 22B. Moreover, the magnetic sensor 210 is used as a rotational angle sensor, but the rotational angle sensor is not limited to the magnetic sensor 210, and a configuration in which a permanent magnet and a giant magnetoresistive (GMR) sensor or an anisotropic magnetoresistive (AMR) sensor are combined, or a resolver, etc., may be used, for example.

Next, torque pulsation-reducing effects according to Embodiment 9 will be explained.

Because the rotary electric machine 101 has an eight-pole forty-eight-slot configuration in which the number of slots per phase per pole is two, slot pitch is 30 electrical degrees. Because the first U-phase winding U1 and the second U-phase winding U2 are housed in adjacent slots, phases of the first U-phase winding U1 and the second U-phase winding U2 are offset by 30 electrical degrees. Phases of the first V-phase winding V1 and the second V-phase winding V2 are similarly offset by 30 electrical degrees, and phases of the first W-phase winding W1 and the second W-phase winding W2 are offset by 30 electrical degrees. Consequently, if a three-phase alternating current in which the phases are offset from each other by 30 electrical degrees is passed through the first three-phase winding 22A and the second three-phase winding 22B, phases of the electrical angular sixth-order torque pulsation that is generated by the magnetomotive force of the first three-phase winding 22A and the electrical angular sixth-order torque pulsation that is generated by the magnetomotive force of the second three-phase winding 22B are inverted such that electrical angular sixth-order torque pulsation is canceled.

In Embodiment 9, because electric currents can be supplied to both a first three-phase winding 22A and a second three-phase winding 22B by including a first inverter circuit 230 and a second inverter circuit 240 and performing separate control of the first inverter circuit 230 and the second inverter circuit 240, electric currents that have different phases can be passed to the first three-phase winding 22A and the second three-phase winding 22B. Consequently, according to Embodiment 9, electrical angular sixth-order torque pulsation can be reduced. Moreover, similar or identical effects can be achieved if the electric current phase difference between the first three-phase winding 22A and the second three-phase winding 22B is approximately 20 through 40 degrees.

In Embodiment 9, because electrical angular sixth-order torque pulsation is reduced, vibration and noise can be further reduced in the rotary electric machine 101. Because electrical angular sixth-order torque pulsation is reduced, torque pulsation can be reduced further for orders in which Ntr is greater than or equal to a twelfth order by appropriately offsetting angles of linking portions that link adjacent tooth tip portions. Now, when reducing sixth-order torque pulsation and cogging torque, in which Ntr is small, it is necessary to maximize θs, but by making Ntr greater than the twelfth order, θs can be reduced. Because vector sums of fundamental wave components of magnetic flux that interlink with the teeth of the stator core 21, which affect the torque of the rotary electric machine 101, are increased when θs is reduced, effects that enable torque reduction to be suppressed can be achieved.

Moreover, in Embodiment 9 above, the rotary electric machine has an eight-pole forty-eight-slot configuration, but the number of poles and the number of slots in the rotary electric machine are not limited thereto, and the effects can be similarly achieved if it has a 2n-pole 12n-slot construction. Here, n is a natural number.

Embodiment 10

Figure 22:
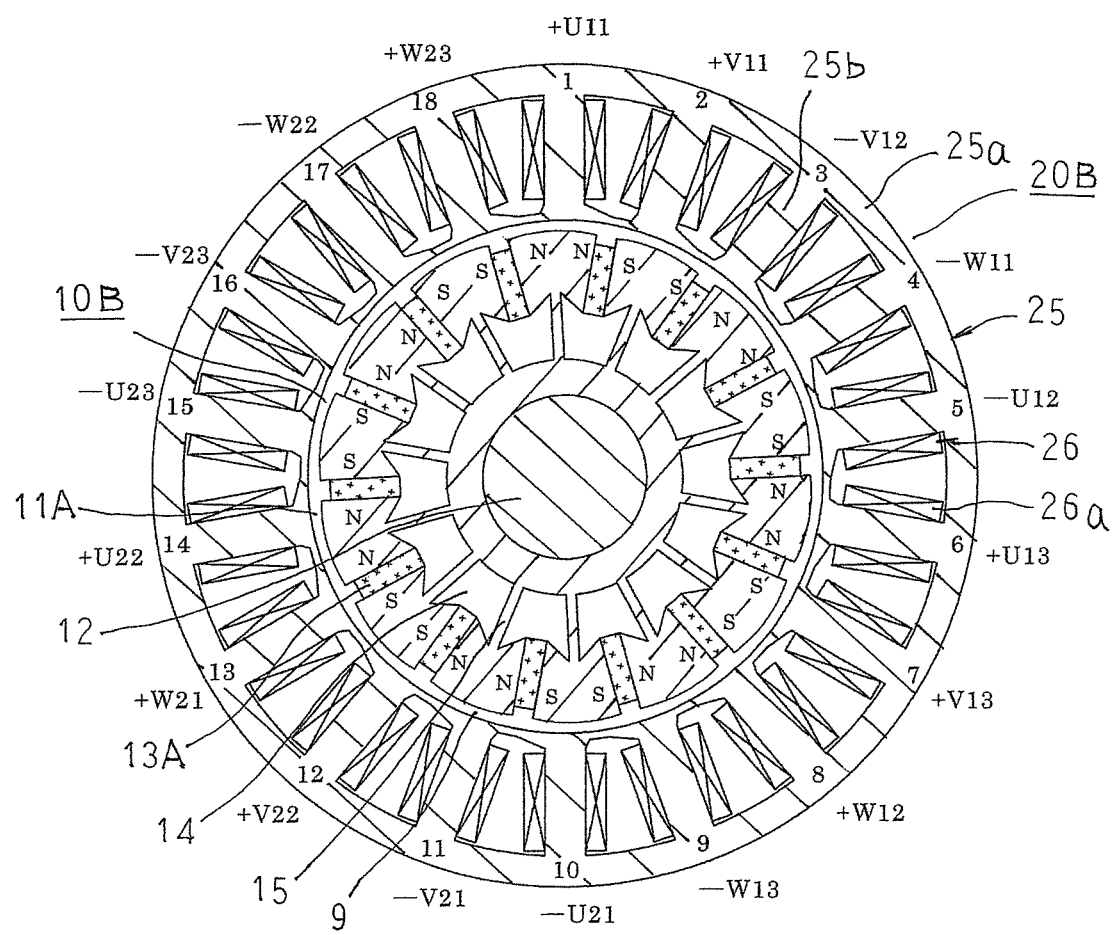
FIG. 22 is a lateral cross section that shows a rotary electric machine according to Embodiment 10 of the present invention.

FIG. 22 is a lateral cross section that shows a rotary electric machine according to Embodiment 10 of the present invention. Moreover, a "lateral cross section" is a cross section in a plane that is perpendicular to a central axis of a rotating shaft of the rotary electric machine. Furthermore, in FIG. 21, 1 through 18 are tooth numbers that are allotted to teeth in order of circumferential arrangement.

In FIG. 22, a rotary electric machine 101B includes: a stator 20B; and a rotor 10B that is coaxially and rotatably disposed inside the stator 20B so as to have a magnetic air gap portion 9 interposed.

The rotor 10B includes: a rotor core 11A that is fixed to a rotating shaft 12 that is passed through a central position; and fourteen permanent magnets 13A that are disposed at a uniform angular pitch circumferentially so as to be embedded in the magnet-embedding portions that are formed on the rotor core 11A. Each of the permanent magnets 13A is produced into a rod-shaped body that has a rectangular cross section, and is disposed such that a long-side longitudinal direction of the rectangular cross section is oriented in a radial direction. In addition, the fourteen permanent magnets 13A are each magnetized such that a direction of magnetization is in a short-side longitudinal direction of the rectangular cross section, and are disposed such that identical polarities face each other. Because the permanent magnets 13A are magnetized such that facing surfaces of adjacent permanent magnets 13A have identical polarity to each other in this manner, magnetic flux is concentrated in the rotor core 11A, increasing magnetic flux density. Furthermore, because the permanent magnets 13A are formed so as to have rectangular cross sections, machining costs for the permanent magnets 13A can be reduced.

Surfaces of portions of the rotor core 11A that face the stator 20B that are positioned between adjacent permanent magnets 13A are formed so as to have curved surface shapes that are radially outwardly convex that minimize the length of the magnetic air gap portion 9 at intermediate points between the adjacent permanent magnets 13A. Thus, a magnetic flux density waveform that is generated in the magnetic air gap portion 9 is smoothed, enabling cogging torque and torque pulsation to be reduced. In addition, because nonmagnetic portions 14 are disposed so as to contact end surfaces on radially inner sides, that is, inner circumferential surfaces, of the permanent magnets 13A, magnetic leakage flux from the permanent magnets 13A can be reduced. Here, the nonmagnetic portions 14 are air, but the nonmagnetic portions are not limited to air, and a nonmagnetic resin may be filled on a radially inner side of the permanent magnets 13A, or a nonmagnetic metal such as a stainless alloy or aluminum may be inserted.

Bridge portions 15 are formed between portions of the rotor core 11A that are positioned between the adjacent permanent magnets 13A and portions thereof that are disposed so as to surround an outer circumference of the rotating shaft 12, so as to link the two portions mechanically. Moreover, the bridge portions 15 are formed so as to link all portions of the rotor core 11A that are positioned between the adjacent permanent magnets 13A and portions thereof that are disposed so as to surround an outer circumference of the rotating shaft 12, but are not limited thereto, and some of the bridge portions 15 that link all portions of the rotor core 11A that are positioned between the adjacent permanent magnets 13A and portions thereof that are disposed so as to surround an outer circumference of the rotating shaft 12 may be omitted. In that case, because the magnetic flux that passes through the omitted the bridge portion 15 is removed, magnetic leakage flux is reduced, enabling torque to be improved.

Thus, the magnetic flux density waveform that is generated in the magnetic air gap portion 9 is smoothed by using the rotor 10B, further reducing cogging torque and torque pulsation, enabling vibration and noise to be reduced in the rotary electric machine 101B. In addition, because a radial length of the permanent magnets 13A is longer than a circumferential length, magnetic flux can be concentrated into the rotor core 13A, enabling increased torque to be achieved in the rotary electric machine 101B. Furthermore, because permanent magnets 13A that have quadrangular cross-sectional shapes can be used, machining costs for the permanent magnets 13A can be reduced, and magnet ejection preventing metal tubes are also no longer necessary, enabling reductions in cost to be achieved in the rotary electric machine 101B.

The stator 20B includes: a stator core 25 that has: an annular core back 25a; and eighteen teeth 25b that protrude radially inward from an inner circumferential wall surface of the core back 25a, and that are disposed at a uniform angular pitch circumferentially; and a stator winding 26 that is constituted by eighteen concentrated winding coils 4a that are wound onto each of the teeth 25b.

The stator winding 26 is constituted by: a U-phase winding that is formed by connecting six concentrated winding coils 26a, namely +U11, −U12, +U13, −U21, +U22, and −U23; a V-phase winding that is formed by connecting six concentrated winding coils 26a, namely +V11, −V12, +V13, −V21, +V22, and −V23; and a W-phase winding that is formed by connecting six concentrated winding coils 26a, namely +W11, −W12, +W13, −W21, +W22, and −W23. The concentrated winding coils 26a are wound onto each of the teeth 25b at Tooth Numbers 1 through 18 so as to line up circumferentially in order of +U11, +V11, −V12, −W11, −U12, +U13, +V13, +W12, −W13, −U21, −V21, +V22, +W21, +U22, −U23, −V23, −W22, and +W23. Here, "+" and "−" indicate winding polarities of the concentrated winding coils 26a, "+" and "−" having opposite winding polarities. The stator winding 26 is configured by connecting these eighteen concentrated winding coils 26a into respective phases, and also connecting them externally.

Figure 23:
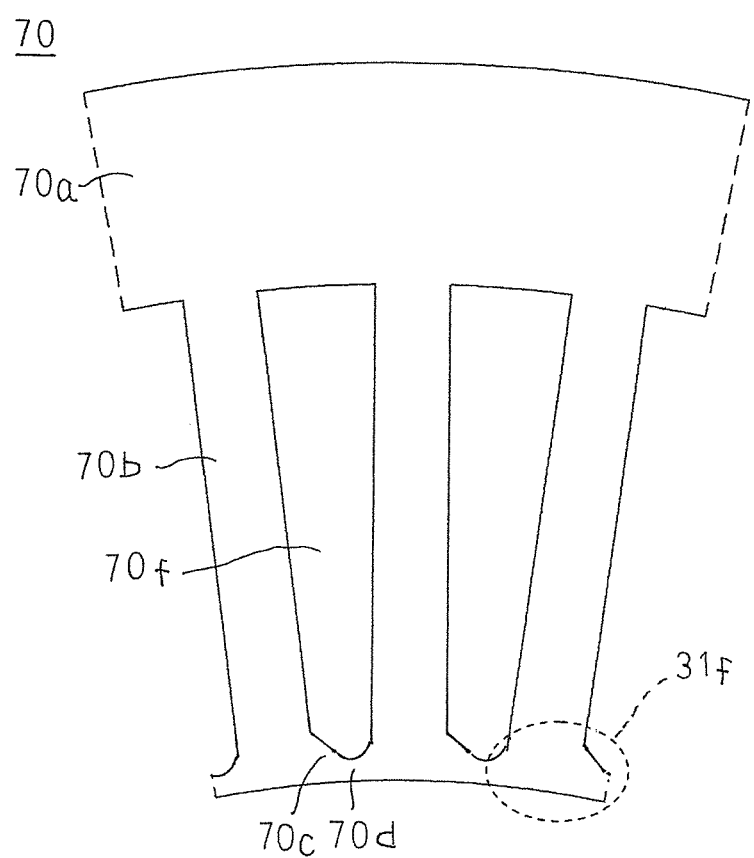
FIG. 23 is a plan that shows a linked core sheet that constitutes part of a stator core in the rotary electric machine according to Embodiment 10 of the present invention.
Figure 24:
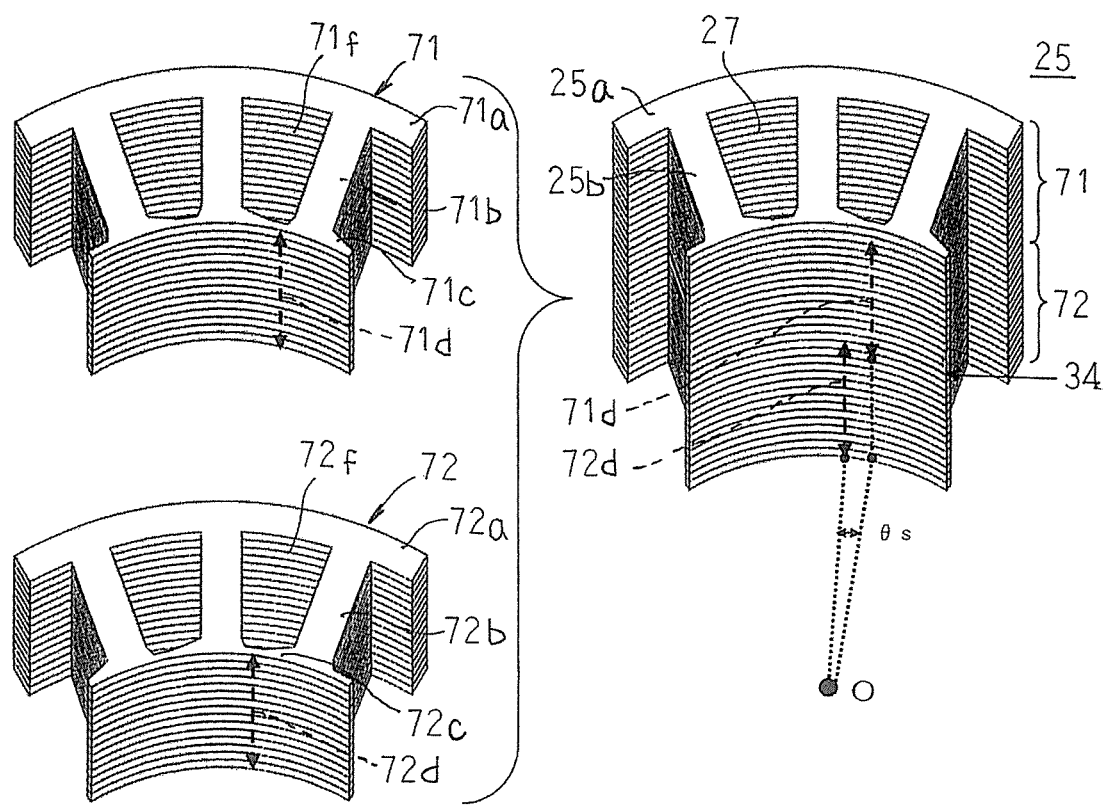
FIG. 24 is a diagram that explains a construction of the stator core in the rotary electric machine according to Embodiment 10 of the present invention.

Next, construction of the stator core 25 will be explained with reference to FIGS. 23 and 24. FIG. 23 is a plan that shows a linked core sheet that constitutes part of a stator core in a rotary electric machine according to Embodiment 10 of the present invention, and FIG. 24 is a diagram that explains a construction of the stator core in the rotary electric machine according to Embodiment 10 of the present invention. Moreover, FIG. 23 shows a model portion representing one sixteenth in a circumferential direction.

In FIG. 23, first linked core sheets 70 are produced by punching sheets of electromagnetic steel plate, for example, and have: an annular core back portion 70a; tooth portions 70b that have a flat rectangular shape that has a constant circumferential width, that are arranged at a pitch angle of θt in a circumferential direction such that each protrudes radially inward from an inner circumferential surface of the core back portion 70a; flange portions 70c that protrude in a first circumferential direction from tips of the tooth portions 70b; linking portions 70d that link the flange portions 70c and the tips of the tooth portions 70b that are positioned in the first circumferential direction; and slot portions 70f that are formed between adjacent tooth portions 70b. The shapes of the respective tooth tip portions 31f are identical, and have a mirror-asymmetrical shape relative to the tooth central axis. The inner circumferential surfaces of the first linked core sheets 70 are formed into a cylindrical surface that is centered around a central axis of the rotating shaft 12. Radially outer surfaces of the linking portions 70d are formed so as to have a convexly curved surface on a radially inner side, and a radial width of the linking portions 70d is narrower than a radial width of the flange portions 70c.

In FIG. 24, a first core block 71 is produced by laminating fifteen first linked core sheets 70 so as to be oriented in an identical direction, and integrating them by crimping or gluing, etc. The core back portions 70a are laminated and integrated to form a core back 71a, the tooth portions 70b are laminated and integrated to form teeth 71b, the flange portions 70c are laminated and integrated to form flanges 71c, the linking portions 70d are laminated and integrated to form linking portions 71d, and the slot portions 70f are laminated to form slot portions 71f.

A second core block 72 is produced by laminating fifteen first linked core sheets 70 so as to be oriented in an identical direction such that front and back surfaces are reversed compared to the first linked core sheets 70 in the first core block 71, and integrating them by crimping or gluing, etc. The core back portions 70a are laminated and integrated to form a core back 72a, the tooth portions 70b are laminated and integrated to form teeth 72b, the flange portions 70c are laminated and integrated to form flanges 72c, the linking portions 70d are laminated and integrated to form linking portions 72d, and the slot portions 70f are laminated to form slot portions 72f.

Then the stator core 25 is produced by laminating the first core block 71 and the second core block 72, and integrating them by crimping or gluing, etc., at a block boundary surface 34. The core backs 71a and 72a are laminated and integrated to form a core back 25a, the teeth 71b and 72b are laminated and integrated to form teeth 25b, and the slot portions 71f and 72f are laminated to form slots 27.

In the stator core 25 that is configured in this manner, positions of the linking portions 71d of the first core block 71 and the linking portions 72d of the second core block 72 are offset at the block boundary surface 34 by an angular difference of θs degrees in a circumferential direction in a plane that is perpendicular to the central axis of the rotating shaft 12 using a point on the central axis of the rotating shaft 12 as an origin.

Thus, in Embodiment 10, because the positions of the linking portions 71d and 72d are also arranged so as to be offset from each other in a circumferential direction, torque pulsation that arises in the linking portions 71d and 72d can be canceled out, enabling torque pulsation that arises in the rotary electric machine 101B to be reduced. Thus, vibration and noise can be reduced in the rotary electric machine 101B.

In Embodiment 10, because the stator winding 26 is configured using concentrated winding coils 26a that are wound so as to be concentrated on teeth 25b, coil ends are reduced, enabling effects to be achieved such as being compact, copper loss being reduced, and efficiency being increased. In the rotary electric machine 101B, the number of magnetic field poles in the rotor 10B is fourteen, and the number of slots in the stator 20B is eighteen, but similar or identical effects can also be achieved even if the number of magnetic field poles and the number of teeth are different, provided that the stator winding is configured using concentrated winding coils.

In Embodiment 10, because the rotary electric machine 101B has a fourteen-pole eighteen-slot construction, electromagnetic vibrational forces that have a spatial order of two can be reduced more than in a ten-pole twelve-slot rotary electric machine in which a stator winding is constituted by concentrated winding coils, enabling effects to be achieved that enable vibration and noise to be reduced. Because harmonics, particularly the winding factors of the electrical angular sixth-order component and the electrical angular twelfth-order component, which are major components of torque pulsation, are reduced, low-frequency components of torque pulsation can be reduced, enabling vibration to be further reduced in the rotary electric machine 101B. Furthermore, since the eighteenth order is the minimum among cogging torque orders Ntr, it is not necessary to reduce low-frequency cogging torque.

From the above, in Embodiment 10, because lower-order torque pulsation is reduced, torque pulsation can be reduced further for orders in which Ntr is greater than or equal to an eighteenth order by appropriately offsetting angles of the linking portions 71d and 72d. Now, when reducing sixth-order or twelfth-order torque pulsation and cogging torque, in which Ntr is small, it is necessary to maximize θs, but by making Ntr greater than the eighteenth order, θs can be reduced. Because vector sums of fundamental wave components of magnetic flux that interlink with the teeth of the stator core, which affect the torque of the rotary electric machine, are increased when θs is reduced, effects that enable torque reduction to be suppressed can be achieved.

Moreover, in Embodiment 10 above, the rotary electric machine has a fourteen-pole eighteen-slot configuration, but the number of poles and the number of slots in the rotary electric machine are not limited thereto, and the effects can be similarly achieved if it has a 14n-pole 18n-slot construction. Here, n is a natural number. Furthermore, it goes without saying that similar or identical effects can also be achieved if the rotary electric machine has a 10n-pole 12n-slot configuration. Here, because harmonics, particularly the winding factors of the electrical angular sixth-order component, which are major components of torque pulsation, are reduced, low-frequency components of torque pulsation can be reduced, enabling vibration to be further reduced in the rotary electric machine. Furthermore, since the twelfth order is the minimum among cogging torque orders Ntr, it is not necessary to reduce low-frequency cogging torque. In that case, because lower-order torque pulsation can be reduced, torque pulsation and cogging torque can be reduced further for orders in which Ntr is greater than or equal to a twelfth order by appropriately offsetting angles of linking portions that link together adjacent tooth tip portions. Now, when reducing sixth-order torque pulsation and cogging torque, in which Ntr is small, it is necessary to maximize θs, but by making Ntr greater than the twelfth order, θs can be reduced. Because vector sums of fundamental wave components of magnetic flux that interlink with the teeth of the stator core, which affect the torque of the rotary electric machine, are increased when θs is reduced, effects that enable torque reduction to be suppressed can be achieved.

It goes without saying that similar or identical effects can also be achieved in 22n-pole 18n-slot and 14n-pole 12n-slot configurations in which the stator winding arrangement or the high-frequency winding factor are equal.

Embodiment 11

FIG. 25 is an explanatory diagram for an automobile electric power steering apparatus according to Embodiment 11 of the present invention.

In FIG. 25, an electric power steering apparatus 500 is mounted with an electric driving apparatus that uses the rotary electric machine 101 according to Embodiment 1 above.

In the electric power steering apparatus 500 that is configured in this manner, since vibration that is generated by the rotary electric machine 101 propagates to a driver through gears, it is desirable for assisting torque to be large, and torque pulsation to be small, in order to achieve a superior steering experience. It is also desirable for vibration and noise to be reduced when the rotary electric machine 101 operates.

However, because the electric power steering apparatus 500 is mounted with the rotary electric machine 101 according to Embodiment 1 above, the effects according to Embodiment 1 above can be achieved. In particular, the rigidity of the rotary electric machine 101 is improved while improving torque, making it possible to achieve both reductions in vibration and noise and increases in torque. Effects can thereby be obtained by which reductions in vibration and noise and increases in torque in the electric power steering apparatus 500 can be achieved.

An electric power steering apparatus on which a rotary electric machine is disposed so as to be oriented parallel to the direction of movement 507 of the rack shaft is a system suitable for large automobiles, but increases in output are also necessary in the rotary electric machine, and one problem has been that vibration and noise that originate from the rotary electric machine also increase together with increases in output. However, because the electric power steering apparatus 500 is mounted with the rotary electric machine 101 according to Embodiment 1 above, this problem can be solved, enabling it also to be applied to large vehicles, and one effect is that fuel consumption can be reduced.

Moreover, in Embodiment 11 above, the rotary electric machine according to Embodiment 1 above is mounted to an electric power steering apparatus, but the effects according to each of Embodiments 2 through 10 can be obtained if the rotary electric machine according to Embodiments 2 through 10 above is mounted thereto.

The invention claimed is:

1. A rotary electric machine comprising:
    a stator comprising:
    a stator core that is configured by laminating in an axial direction a plurality of core sheets that are made of a magnetic material; and
    a stator winding that is mounted to said stator core; and
    a rotor that is disposed coaxially inside said stator so as to have a magnetic air gap interposed, said rotor having a plurality of field poles,
    wherein:
    said plurality of core sheets each comprise:
    an annular core back portion;
    a plurality of tooth portions that are arranged at a uniform angular pitch in a circumferential direction such that each protrudes radially inward from said core back portion;
    slot portions that are formed between adjacent teeth portions; and
    flange portions that protrude circumferentially from a protruding end of each of said tooth portions;
    said plurality of core sheets comprise linked core sheets that comprise linking portions that protrude circumferentially from said flange portions so as to link together tip portions of said adjacent tooth portions;
    at least one sheet of said linked core sheets is formed such that a tooth tip portion shape is mirror-asymmetrical relative to a tooth central axis that passes through a circumferential center of said tooth portions; and
    said stator core is configured by laminating said linked core sheets such that circumferential positions of said linking portions are offset.

2. The rotary electric machine according to claim 1, wherein said stator core is configured by laminating a plurality of core blocks that are each configured by laminating said linked core sheets such that circumferential positions of said linking portions are identical.

3. The rotary electric machine according to claim 2, wherein:
    said rotor is configured by disposing a plurality of rotor blocks in an axial direction such that circumferential positions of said field poles are offset in a circumferential direction; and
    said plurality of rotor blocks each face said plurality of core blocks in which said circumferential positions of said linking portions are different across said magnetic air gap portion.

4. The rotary electric machine according to claim 1, wherein:
    said stator core is configured by laminating N types of core blocks that are each configured by laminating said linked core sheets such that circumferential positions of said linking portions are identical, where N is a natural number that is greater than or equal to 2; and two core blocks adjacent to each other among said N types of core blocks are laminated such that said circumferential positions of said linking portions are offset by an angular difference of θs°/(N−1) from each other in said circumferential direction, where Os° is an angular difference between said linking portions of a first core block and an Nth core block in the laminating direction of said N types of core blocks.

5. The rotary electric machine according to claim 4, wherein:
1-≤α≤1.2 is satisfied,
where said N is 2, a number of orders of torque pulsation is Ntr, a number of magnetic field poles is p, and a=θs/(360/Ntr/p).

6. The rotary electric machine according to claim 4, wherein block boundary surfaces between said laminated core blocks exist at (N−1) positions.

7. The rotary electric machine according to claim 1, wherein at least one sheet of said linked core sheets is formed such that said tooth tip portion shape is mirror-symmetrical relative to said tooth central axis that passes through said circumferential center of said tooth portions.

8. The rotary electric machine according to claim 1, wherein said plurality of core sheets further include open core sheets that comprise opening portions between tip portions of said adjacent tooth portions.

9. The rotary electric machine according to claim 8, wherein:
at least one sheet of said open core sheet is formed such that said tooth tip portion shape is mirror-asymmetrical relative to said tooth central axis that passes through said circumferential center of said tooth portions; and
said stator core is configured by laminating said open core sheets such that circumferential positions of said opening portions are offset.

10. The rotary electric machine according to claim 8, wherein said stator core is configured by laminating a plurality of core blocks that are each configured by laminating said linked core sheets and said open core sheets such that circumferential positions of said linking portions and circumferential positions of said opening portions are identical.

11. The rotary electric machine according to claim 10, wherein a ratio of a number of laminated sheets of said open core sheets relative to a number of laminated sheets of said linked core sheets is equal in all of said plurality of core blocks.

12. The rotary electric machine according to claim 10, wherein:
said open core sheets are disposed at block boundary surfaces of said core blocks; and
a circumferential width of said opening portions of said open core sheets that are disposed at said block boundary surfaces is wider than a circumferential width of said linking portions.

13. The rotary electric machine according to claim 1, wherein said linked core sheets are formed such that a radial width of said linking portions is narrower than a radial width of said flange portions.

14. The rotary electric machine according to claim 13, wherein indented portions that are indented radially outward are formed on inner circumferential surfaces of said linking portions of said linked core sheets that face said rotor.

15. The rotary electric machine according to claim 1, wherein each of said plurality of core sheets is formed such that said flange portions protrude from said protruding end of each of said tooth portions only on one circumferential side.

16. The rotary electric machine according to claim 15, wherein said tooth tip portions of said linked core sheets in which said tooth tip portion shape is asymmetrical relative to said tooth central axis are formed so as to exceed θt/2 in a first circumferential direction from said tooth central axis, where θt is a pitch angle of said tooth portions.

17. The rotary electric machine according to claim 1, wherein said stator winding is configured by inserting a plurality of coil segments that are formed so as to have a U shape from a first axial end of said stator core so as to be in two different slots each, and joining together coil terminals of said plurality of coil segments that protrude from said slots at a second axial end.

18. The rotary electric machine according to claim 1, wherein a circumferential width near tip ends of each of said tooth portions of said plurality of core sheets is wider than a minimum circumferential width of said tooth portions.

19. The rotary electric machine according to claim 1, wherein each of said slot portions of said plurality of core sheets is formed so as to have a trapezoidal cross-sectional shape.

20. The rotary electric machine according to claim 1, wherein
said plurality of core sheets are each divided into two portions including a portion in a vicinity of said core back portion and a portion in a vicinity of said tooth portions.

21. The rotary electric machine according to claim 1, wherein:
said stator winding comprises:
a first three-phase winding that comprises a U1-phase winding, a V1-phase winding, and a W1-phase winding; and
a second three-phase winding that comprises a U2-phase winding, a V2-phase winding, and a W2-phase winding;
said rotary electric machine is configured such that an electric current is supplied to said first three-phase winding by means of a first inverter circuit, and an electric current is supplied to said second three-phase winding by means of a second inverter circuit that is different than said first inverter circuit;
said U1-phase winding and said U2-phase winding are housed in mutually adjacent slots;
said V1-phase winding and said V2-phase winding are housed in mutually adjacent slots;
said W1-phase winding and said W2-phase winding are housed in mutually adjacent slots; and
phases of said electric current that is supplied to said first three-phase winding and said electric current that is supplied to said second three-phase winding are offset by an electrical angle that is greater than or equal to 20 degrees and less than or equal to 40 degrees.

22. The rotary electric machine according to claim 1, wherein:
said stator winding is constituted by concentrated winding coils; and
a number of magnetic field poles is (18±4)n and a number of slots is 18n, or said number of magnetic field poles is (12±2)n and said number of slots is 12n, where n is a natural number.

23. An electric power steering apparatus to which is mounted the rotary electric machine according to claim 1.

* * * * *